US012245012B2

(12) United States Patent
Krueger et al.

(10) Patent No.: US 12,245,012 B2
(45) **Date of Patent: *Mar. 4, 2025**

(54) METHOD AND APPARATUS FOR COMPRESSING AND DECOMPRESSING A HIGHER ORDER AMBISONICS SIGNAL REPRESENTATION

(71) Applicant: Dolby Laboratories Licensing Corporation, San Francisco, CA (US)

(72) Inventors: Alexander Krueger, Hannover (DE); Sven Kordon, Wunstorf (DE); Johannes Boehm, Göttingen (DE); Johann-Markus Batke, Hannover (DE)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,280

(22) Filed: Oct. 16, 2023

(65) Prior Publication Data

US 2024/0147173 A1 May 2, 2024

Related U.S. Application Data

(60) Continuation of application No. 17/548,485, filed on Dec. 10, 2021, now Pat. No. 11,792,591, which is a (Continued)

(30) Foreign Application Priority Data

May 14, 2012 (EP) .................................... 12305537

(51) Int. Cl.
*H04S 3/00* (2006.01)
*G10L 19/008* (2013.01)
(Continued)

(52) U.S. Cl.
CPC ............ *H04S 3/008* (2013.01); *G10L 19/008* (2013.01); *G10L 19/20* (2013.01); *H04H 20/89* (2013.01); *H04S 3/02* (2013.01); *H04S 2420/11* (2013.01)

(58) Field of Classification Search
CPC ........ H04S 3/008; H04S 3/02; H04S 2420/11; G10L 19/008; G10L 19/20; G10L 19/00
(Continued)

(56) References Cited

U.S. PATENT DOCUMENTS

| | | |
|---|---|---|
| 7,231,054 B1 | 6/2007 | Jot |
| 8,374,365 B2 | 2/2013 | Goodwin |

(Continued)

FOREIGN PATENT DOCUMENTS

| | | |
|---|---|---|
| CN | 1179074 | 4/1998 |
| CN | 1677490 | 10/2005 |

(Continued)

OTHER PUBLICATIONS

Daniel, J. et al "Further Investigations of High Order Ambisonics and Wavefield Synthesis for Holophonic Sound Imaging" AES presented at the 114th convention, Mar. 22-25, 2003, Amsterdam, The Netherlands, pp. 1-18.

(Continued)

*Primary Examiner* — Disler Paul

(57) ABSTRACT

A method and apparatus for decompressing a Higher Order Ambisonics (HOA) signal representation is disclosed. The apparatus includes an input interface that receives an encoded directional signal and an encoded ambient signal and an audio decoder that perceptually decodes the encoded directional signal and encoded ambient signal to produce a decoded directional signal and a decoded ambient signal, respectively. The apparatus further includes an extractor for obtaining side information related to the directional signal (Continued)

and an inverse transformer for converting the decoded ambient signal from a spatial domain to an HOA domain representation of the ambient signal. The apparatus also includes a synthesizer for recomposing a Higher Order Ambisonics (HOA) signal from the HOA domain representation of the ambient signal and the decoded directional signal. The side information includes a direction of the directional signal selected from a set of uniformly spaced directions.

5 Claims, 2 Drawing Sheets

Related U.S. Application Data continuation of application No. 16/458,526, filed on Jul. 1, 2019, now Pat. No. 11,234,091, which is a division of application No. 15/927,985, filed on Mar. 21, 2018, now Pat. No. 10,390,164, which is a division of application No. 15/221,354, filed on Jul. 27, 2016, now Pat. No. 9,980,073, which is a continuation of application No. 14/400,039, filed as application No. PCT/EP2013/059363 on May 6, 2013, now Pat. No. 9,454,971.

(51) Int. Cl.

| | |
|---|---|
| ***G10L 19/20*** | (2013.01) |
| ***H04H 20/89*** | (2008.01) |
| *H04S 3/02* | (2006.01) |

(58) Field of Classification Search
USPC .................................................... 381/22-23
See application file for complete search history.

(56) References Cited

U.S. PATENT DOCUMENTS

| | | | | |
|---|---|---|---|---|
| 8,817,991 | B2 * | 8/2014 | Jaillet | H04S 3/008 381/23 |
| 9,058,803 | B2 * | 6/2015 | Daniel | G10L 19/008 |
| 9,078,076 | B2 | 7/2015 | Furse | |
| 9,241,216 | B2 * | 1/2016 | Keiler | H04R 5/02 |
| 9,622,008 | B2 | 4/2017 | Krueger | |
| 9,668,079 | B2 | 5/2017 | Kordon | |
| 9,723,427 | B2 | 8/2017 | Lee | |
| 9,832,584 | B2 | 11/2017 | Boehm | |
| 9,838,822 | B2 | 12/2017 | Boehm | |
| 10,796,704 | B2 | 10/2020 | Goodwin | |
| 11,429,340 | B2 | 8/2022 | Munoz | |
| 2004/0025386 | A1 | 2/2004 | Piana | |
| 2008/0049943 | A1 | 2/2008 | Faller | |
| 2008/0123731 | A1 | 5/2008 | Wegener | |
| 2009/0092259 | A1 | 4/2009 | Jot | |
| 2009/0240495 | A1 | 9/2009 | Ramakrishnan | |
| 2009/0252356 | A1 | 10/2009 | Goodwin | |
| 2009/0262969 | A1 | 10/2009 | Short | |
| 2011/0173009 | A1 | 7/2011 | Fuchs | |
| 2011/0249821 | A1 | 10/2011 | Jaillet | |
| 2011/0264454 | A1 | 10/2011 | Ullberg | |
| 2012/0014527 | A1 | 1/2012 | Furse | |
| 2012/0029912 | A1 | 2/2012 | Almagro | |
| 2012/0065965 | A1 | 3/2012 | Choo | |
| 2012/0155653 | A1 * | 6/2012 | Jax | G10L 19/008 381/23 |
| 2012/0314878 | A1 | 12/2012 | Daniel | |
| 2013/0216070 | A1 | 8/2013 | Keiler et al. | |
| 2014/0247946 | A1 | 9/2014 | Sen et al. | |
| 2014/0358565 | A1 | 12/2014 | Peters et al. | |
| 2015/0332679 | A1 * | 11/2015 | Kruger | G10L 19/008 |
| 2016/0057556 | A1 | 2/2016 | Boehm | |
| 2018/0075852 | A1 | 3/2018 | Chen | |

FOREIGN PATENT DOCUMENTS

| | | | |
|---|---|---|---|
| CN | 1684473 | | 10/2005 |
| CN | 101884065 | | 11/2006 |
| CN | 1930915 | | 3/2007 |
| CN | 101202043 | | 6/2008 |
| CN | 101206860 | | 6/2008 |
| CN | 101583921 | | 11/2009 |
| CN | 101690270 | | 3/2010 |
| CN | 101946526 | | 1/2011 |
| CN | 102318372 | | 1/2012 |
| CN | 102326417 | | 1/2012 |
| CN | 101199121 | B | 3/2012 |
| CN | 102547549 | | 7/2012 |
| CN | 101889307 | B | 1/2013 |
| EP | 2450880 | | 5/2012 |
| EP | 2451196 | A1 | 5/2012 |
| EP | 2469741 | | 6/2012 |
| JP | 2012-133366 | | 7/2012 |
| JP | 2015-520411 | | 7/2015 |
| JP | 2015525897 | A | 9/2015 |
| JP | 2020144384 | A | 9/2020 |
| TW | 200818700 | | 4/2008 |
| TW | 201011737 | | 3/2010 |
| TW | 201127016 | A | 8/2011 |
| WO | 98/53565 | W | 11/1998 |
| WO | 2009/046223 | | 4/2009 |
| WO | 2009067741 | A1 | 6/2009 |
| WO | 2011/104463 | | 9/2011 |
| WO | 2011/117399 | | 9/2011 |
| WO | 2012/023864 | | 2/2012 |
| WO | 2012/059385 | | 5/2012 |
| WO | 2012/085410 | | 6/2012 |
| WO | 2013/000740 | | 1/2013 |
| WO | 2014014600 | | 1/2014 |

OTHER PUBLICATIONS

Elfitri et al., "Multichannel Audio Coding Based on Analysis by Synthesis". Proceedings of the IEEE, vol. 99: No. 4, pp. 657-670, Apr. 2011.
EPAiN et al., "The Application of Compressive Sampling to Analysis and Synthesis of Spatial Sound Fields" presented at the 127th Convention of AES, Oct. 9-12, 2009, New York, NY, USA, pp. 1-12.
Hellerud, E. et al "Spatial Redundancy in Higher Order Ambisonics and Its Use for Low Delay Lossless Compression" IEEE International Conference on Acoustics, Speech and Signal Processing, pp. 2009, pp. 269-272.
Hellerud, E. et al, "Encoding Higher Order Ambisonics with AAC", presented at the AES 124th Convention, May 17-20, 2008, Amsterdam, the Netherlands, pp. 1-8.
Kuhn: "The Hungarian method for the assignment problem". Naval Research Logistics Quarterly 2, No. 1-2. pp. 83-97, 1955.
Levin, D. et al "Direction-of-Arrival Estimation using Acoustic Vector Sensors in the Presence of Noise" , pp. 105-108, 2011.
Okamoto, T. et al "Implementation of a High-Definition 3D Audio-Visual Display Based on Higher-Order Ambisonics Using a 157-Loudspeaker Array Combined with a 3D Projection Display" IEEE Proc. of IC-NIDC2010.
Poletti, Mark, "Unified Description of Ambisonics using Real and Complex Spherical Harmonics", Ambisonics Symposium, Jun. 25-27, 2009; pp. 1-10.
Pulkki, Ville, "Spatial Sound Reproduction with Directional Audio Coding" J. Audio Eng. Soc. vol. 55, No. 6, Jun. 2007, pp. 503-516.
Pulkki, Ville, "Virtual Sound Source Positioning Using Vector Base Amplitude Panning" J. Audio Eng. Soc. vol. 45, No. 6, Jun. 1997.
Rafaely, B. et al "Plane Wave Decomposition of the Sound Field on a Sphere by Spherical Convolution" ISVR Technical Memorandum 910, May 2003, pp. 1-40.
Rafaely, B. et al "Spatial Aliasing in Spherical Microphone Arrays", IEEE Transactions on Signal Processing, vol. 55, No. 3, Mar. 2007, pp. 1003-1010.
Rafaely, Boaz, "Analysis and Design of Spherical Microphone Arrays" IEEE Transactions on Speech and Audio Processing, vol. 13, No. 1, Jan. 2005, pp. 135-143.

(56) References Cited

OTHER PUBLICATIONS

Sun, H. et al "Optimal Higher Order Ambisonics Encoding with Predefined Constraints" IEEE Transactions on Audio, Speech, and Language Processing, vol. 20, Issue 3, Mar. 2012, pp. 742-754.
Wabnitz, A. et al "Time Domain Reconstruction of Spatial Sound Fields Using Compressed Sensing," ICASSP, IEEE, 2011, pp. 465-468.
Williams, E., "Fourier Acoustics", Academic Press, ISBN 978-0127539607, Jun. 10, 1999, p. 1.
Williams: "Fourier Acoustics", vol. 93 of Applied Mathematical Sciences. Academic Press 1999. p. 1.

* cited by examiner

METHOD AND APPARATUS FOR COMPRESSING AND DECOMPRESSING A HIGHER ORDER AMBISONICS SIGNAL REPRESENTATION

CROSS-REFERENCE TO RELATED APPLICATIONS

This application is a continuation of U.S. patent application Ser. No. 17/548,485, filed Dec. 10, 2021, now U.S. Pat. No. 11,792,591, which is a continuation of U.S. patent application Ser. No. 16/458,526, filed Jul. 1, 2019, now U.S. Pat. No. 11,234,091, which is a divisional of U.S. patent application Ser. No. 15/927,985, filed Mar. 21, 2018, now U.S. Pat. No. 10,390,164, which is a divisional of U.S. patent application Ser. No. 15/221,354, filed Jul. 27, 2016, now U.S. Pat. No. 9,980,073, which is a continuation of U.S. patent application Ser. No. 14/400,039, filed Nov. 10, 2014, now U.S. Pat. No. 9,454,971, which is U.S. National Stage of International Application No. PCT/EP2013/059363, filed May 6, 2013, which claims priority to European Patent Application No. 12305537.8, filed May 14, 2012, each of which is hereby incorporated by reference in its entirety.

TECHNICAL FIELD

The invention relates to a method and to an apparatus for compressing and decompressing a Higher Order Ambisonics signal representation, wherein directional and ambient components are processed in a different manner.

BACKGROUND

Higher Order Ambisonics (HOA) offers the advantage of capturing a complete sound field in the vicinity of a specific location in the three dimensional space, which location is called 'sweet spot'. Such HOA representation is independent of a specific loudspeaker set-up, in contrast to channel-based techniques like stereo or surround. But this flexibility is at the expense of a decoding process required for playback of the HOA representation on a particular loudspeaker set-up.

HOA is based on the description of the complex amplitudes of the air pressure for individual angular wave numbers k for positions x in the vicinity of a desired listener position, which without loss of generality may be assumed to be the origin of a spherical coordinate system, using a truncated Spherical Harmonics (SH) expansion. The spatial resolution of this representation improves with a growing maximum order N of the expansion. Unfortunately, the number of expansion coefficients O grows quadratically with the order N, i.e. $O=(N+1)^2$. For example, typical HOA representations using order N=4 require O=25 HOA coefficients. Given a desired sampling rate $f_s$ and the number $N_b$ of bits per sample, the total bit rate for the transmission of an HOA signal representation is determined by $O \cdot f_s \cdot N_b$, and transmission of an HOA signal representation of order N=4 with a sampling rate of $f_s$=48 kHz employing $N_b$=16 bits per sample is resulting in a bit rate of 19.2 M Bits/s. Thus, compression of HOA signal representations is highly desirable.

An overview of existing spatial audio compression approaches can be found in patent application EP 10306472.1 or in I. Elfitri, B. Günel, A. M. Kondoz, "Multichannel Audio Coding Based on Analysis by Synthesis", Proceedings of the IEEE, vol. 99, no. 4, pp. 657-670, April 2011.

The following techniques are more relevant with respect to the invention.

B-format signals, which are equivalent to Ambisonics representations of first order, can be compressed using Directional Audio Coding (DirAC) as described in V. Pulkki, "Spatial Sound Reproduction with Directional Audio Coding", Journal of Audio Eng. Society, vol. 55(6), pp. 503-516, 2007. In one version proposed for teleconference applications, the B-format signal is coded into a single omni-directional signal as well as side information in the form of a single direction and a diffuseness parameter per frequency band. However, the resulting drastic reduction of the data rate comes at the price of a minor signal quality obtained at reproduction. Further, DirAC is limited to the compression of Ambisonics representations of first order, which suffer from a very low spatial resolution.

The known methods for compression of HOA representations with N>1 are quite rare. One of them performs direct encoding of individual HOA coefficient sequences employing the perceptual Advanced Audio Coding (AAC) codec, c.f. E. Hellerud, I. Burnett, A. Solvang, U. Peter Svensson, "Encoding Higher Order Ambisonics with AAC", 124th AES Convention, Amsterdam, 2008. However, the inherent problem with such approach is the perceptual coding of signals that are never listened to. The reconstructed playback signals are usually obtained by a weighted sum of the HOA coefficient sequences. That is why there is a high probability for the unmasking of perceptual coding noise when the decompressed HOA representation is rendered on a particular loudspeaker set-up. In more technical terms, the major problem for perceptual coding noise unmasking is the high cross-correlations between the individual HOA coefficients sequences. Because the coded noise signals in the individual HOA coefficient sequences are usually uncorrelated with each other, there may occur a constructive superposition of the perceptual coding noise while at the same time the noise-free HOA coefficient sequences are cancelled at superposition. A further problem is that the mentioned cross correlations lead to a reduced efficiency of the perceptual coders.

In order to minimise the extent these effects, it is proposed in EP 10306472.1 to transform the HOA representation to an equivalent representation in the spatial domain before perceptual coding. The spatial domain signals correspond to conventional directional signals, and would correspond to the loudspeaker signals if the loudspeakers were positioned in exactly the same directions as those assumed for the spatial domain transform.

The transform to spatial domain reduces the cross-correlations between the individual spatial domain signals. However, the cross-correlations are not completely eliminated. An example for relatively high cross-correlations is a directional signal, whose direction falls in-between the adjacent directions covered by the spatial domain signals.

A further disadvantage of EP 10306472.1 and the above-mentioned Hellerud et al. article is that the number of perceptually coded signals is $(N+1)^2$, where N is the order of the HOA representation. Therefore, the data rate for the compressed HOA representation is growing quadratically with the Ambisonics order.

The inventive compression processing performs a decomposition of an HOA sound field representation into a directional component and an ambient component. In particular for the computation of the directional sound field component a new processing is described below for the estimation of several dominant sound directions.

Regarding existing methods for direction estimation based on Ambisonics, the above-mentioned Pulkki article describes one method in connection with DirAC coding for the estimation of the direction, based on the B-format sound field representation. The direction is obtained from the average intensity vector, which points to the direction of flow of the sound field energy. An alternative based on the B-format is proposed in D. Levin, S. Gannot, E. A. P. Habets, "Direction-of-Arrival Estimation using Acoustic Vector Sensors in the Presence of Noise", IEEE Proc. of the ICASSP, pp. 105-108, 2011. The direction estimation is performed iteratively by searching for that direction which provides the maximum power of a beam former output signal steered into that direction.

However, both approaches are constrained to the B-format for the direction estimation, which suffers from a relatively low spatial resolution. An additional disadvantage is that the estimation is restricted to only a single dominant direction.

HOA representations offer an improved spatial resolution and thus allow an improved estimation of several dominant directions. The existing methods performing an estimation of several directions based on HOA sound field representations are quite rare. An approach based on compressive sensing is proposed in N. Epain, C. Jin, A. van Schaik, "The Application of Compressive Sampling to the Analysis and Synthesis of Spatial Sound Fields", 127th Convention of the Audio Eng. Soc., New York, 2009, and in A. Wabnitz, N. Epain, A. van Schaik, C Jin, "Time Domain Reconstruction of Spatial Sound Fields Using Compressed Sensing", IEEE Proc. of the ICASSP, pp. 465-468, 2011. The main idea is to assume the sound field to be spatially sparse, i.e. to consist of only a small number of directional signals. Following allocation of a high number of test directions on the sphere, an optimisation algorithm is employed in order to find as few test directions as possible together with the corresponding directional signals, such that they are well described by the given HOA representation. This method provides an improved spatial resolution compared to that which is actually provided by the given HOA representation, since it circumvents the spatial dispersion resulting from a limited order of the given HOA representation. However, the performance of the algorithm heavily depends on whether the sparsity assumption is satisfied. In particular, the approach fails if the sound field contains any minor additional ambient components, or if the HOA representation is affected by noise which will occur when it is computed from multi-channel recordings.

A further, rather intuitive method is to transform the given HOA representation to the spatial domain as described in B. Rafaely, "Plane-wave decomposition of the sound field on a sphere by spherical convolution", J. Acoust. Soc. Am., vol. 4, no. 116, pp. 2149-2157, October 2004, and then to search for maxima in the directional powers. The disadvantage of this approach is that the presence of ambient components leads to a blurring of the directional power distribution and to a displacement of the maxima of the directional powers compared to the absence of any ambient component.

INVENTION

A problem to be solved by the invention is to provide a compression for HOA signals whereby the high spatial resolution of the HOA signal representation is still kept. This problem is solved by the methods and apparatuses as disclosed in the claims.

The invention addresses the compression of Higher Order Ambisonics HOA representations of sound fields. In this application, the term 'HOA' denotes the Higher Order Ambisonics representation as such as well as a correspondingly encoded or represented audio signal. Dominant sound directions are estimated and the HOA signal representation is decomposed into a number of dominant directional signals in time domain and related direction information, and an ambient component in HOA domain, followed by compression of the ambient component by reducing its order. After that decomposition, the ambient HOA component of reduced order is transformed to the spatial domain, and is perceptually coded together with the directional signals.

At receiver or decoder side, the encoded directional signals and the order-reduced encoded ambient component are perceptually decompressed. The perceptually decompressed ambient signals are transformed to an HOA domain representation of reduced order, followed by order extension. The total HOA representation is re-composed from the directional signals and the corresponding direction information and from the original-order ambient HOA component.

Advantageously, the ambient sound field component can be represented with sufficient accuracy by an HOA representation having a lower than original order, and the extraction of the dominant directional signals ensures that, following compression and decompression, a high spatial resolution is still achieved.

In principle, the inventive method is suited for compressing a Higher Order Ambisonics HOA signal representation, said method including the steps:

- estimating dominant directions, wherein said dominant direction estimation is dependent on a directional power distribution of the energetically dominant HOA components;
- decomposing or decoding the HOA signal representation into a number of dominant directional signals in time domain and related direction information, and a residual ambient component in HOA domain, wherein said residual ambient component represents the difference between said HOA signal representation and a representation of said dominant directional signals;
- compressing said residual ambient component by reducing its order as compared to its original order;
- transforming said residual ambient HOA component of reduced order to the spatial domain;
- perceptually encoding said dominant directional signals and said transformed residual ambient HOA component.

In principle, the inventive method is suited for decompressing a Higher Order Ambisonics HOA signal representation that was compressed by the steps:

- estimating dominant directions, wherein said dominant direction estimation is dependent on a directional power distribution of the energetically dominant HOA components;
- decomposing or decoding the HOA signal representation into a number of dominant directional signals in time domain and related direction information, and a residual ambient component in HOA domain, wherein said residual ambient component represents the difference between said HOA signal representation and a representation of said dominant directional signals;
- compressing said residual ambient component by reducing its order as compared to its original order;
- transforming said residual ambient HOA component of reduced order to the spatial domain;

perceptually encoding said dominant directional signals and said transformed residual ambient HOA component, said method including the steps:

perceptually decoding said perceptually encoded dominant directional signals and said perceptually encoded transformed residual ambient HOA component;

inverse transforming said perceptually decoded transformed residual ambient HOA component so as to get an HOA domain representation;

performing an order extension of said inverse transformed residual ambient HOA component so as to establish an original-order ambient HOA component;

composing said perceptually decoded dominant directional signals, said direction information and said original-order extended ambient HOA component so as to get an HOA signal representation.

In principle the inventive apparatus is suited for compressing a Higher Order Ambisonics HOA signal representation, said apparatus including:

means being adapted for estimating dominant directions, wherein said dominant direction estimation is dependent on a directional power distribution of the energetically dominant HOA components;

means being adapted for decomposing or decoding the HOA signal representation into a number of dominant directional signals in time domain and related direction information, and a residual ambient component in HOA domain, wherein said residual ambient component represents the difference between said HOA signal representation and a representation of said dominant directional signals;

means being adapted for compressing said residual ambient component by reducing its order as compared to its original order;

means being adapted for transforming said residual ambient HOA component of reduced order to the spatial domain;

means being adapted for perceptually encoding said dominant directional signals and said transformed residual ambient HOA component.

In principle the inventive apparatus is suited for decompressing a Higher Order Ambisonics HOA signal representation that was compressed by the steps:

estimating dominant directions, wherein said dominant direction estimation is dependent on a directional power distribution of the energetically dominant HOA components;

decomposing or decoding the HOA signal representation into a number of dominant directional signals in time domain and related direction information, and a residual ambient component in HOA domain, wherein said residual ambient component represents the difference between said HOA signal representation and a representation of said dominant directional signals;

compressing said residual ambient component by reducing its order as compared to its original order;

transforming said residual ambient HOA component of reduced order to the spatial domain;

perceptually encoding said dominant directional signals and said transformed residual ambient HOA component, said apparatus including:

means being adapted for perceptually decoding said perceptually encoded dominant directional signals and said perceptually encoded transformed residual ambient HOA component;

means being adapted for inverse transforming said perceptually decoded transformed residual ambient HOA component so as to get an HOA domain representation;

means being adapted for performing an order extension of said inverse transformed residual ambient HOA component so as to establish an original-order ambient HOA component;

means being adapted for composing said perceptually decoded dominant directional signals, said direction information and said original-order extended ambient HOA component so as to get an HOA signal representation.

In other embodiments, an apparatus for decompressing a Higher Order Ambisonics (HOA) signal representation is disclosed. The apparatus includes an input interface that receives an encoded directional signal and an encoded ambient signal and an audio decoder that perceptually decodes the encoded directional signal and encoded ambient signal to produce a decoded directional signal and a decoded ambient signal, respectively. The apparatus further includes an extractor for obtaining side information related to the directional signal and an inverse transformer for converting the decoded ambient signal from a spatial domain to an HOA domain representation of the ambient signal. The apparatus also includes a synthesizer for recomposing a Higher Order Ambisonics (HOA) signal from the HOA domain representation of the ambient signal and the decoded directional signal. The side information includes a direction of the direction signal selected from a set of uniformly spaced directions.

Advantageous additional embodiments of the invention are disclosed in the respective dependent claims.

DRAWINGS

Exemplary embodiments of the invention are described with references to the accompanying drawings.

EXEMPLARY EMBODIMENTS

Figure 1:
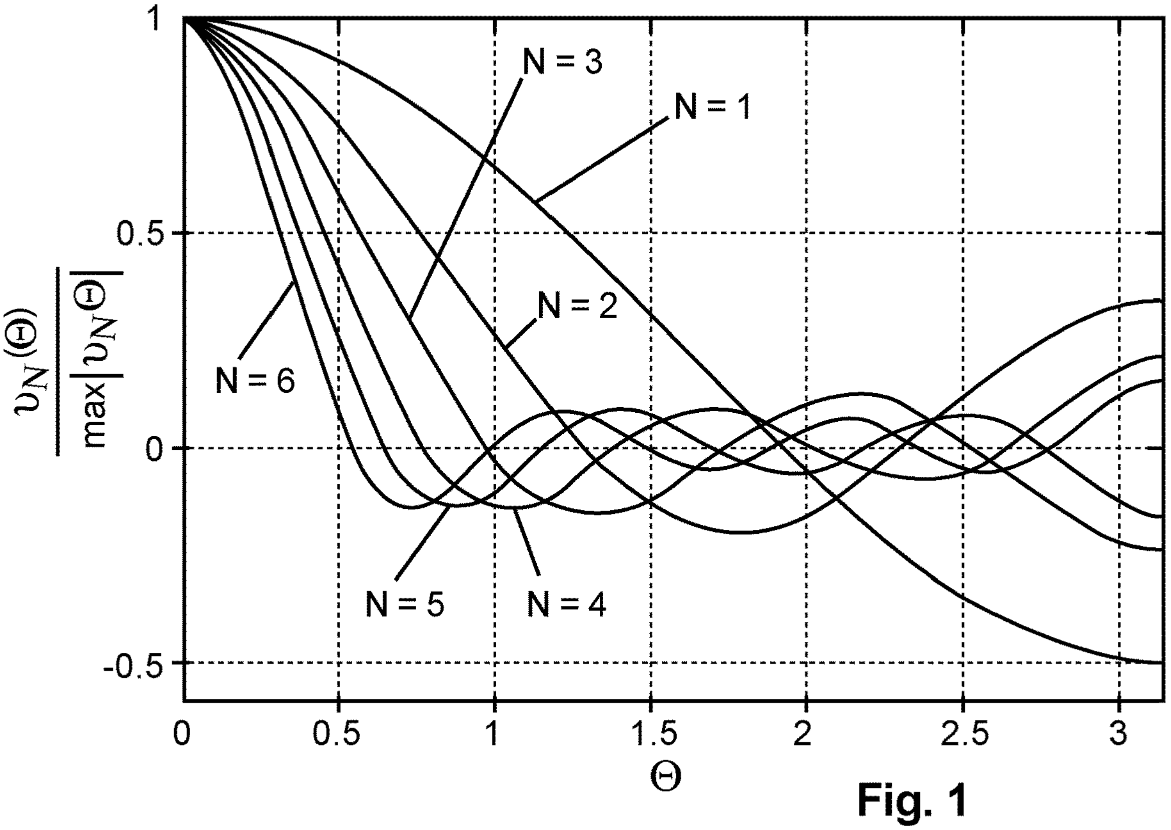
FIG. 1 illustrates normalised dispersion function $v_N(\Theta)$ for different Ambisonics orders N and for angles $\Theta \in [0, \pi]$.

Ambisonics signals describe sound fields within source-free areas using Spherical Harmonics (SH) expansion. The feasibility of this description can be attributed to the physical property that the temporal and spatial behaviour of the sound pressure is essentially determined by the wave equation.

Wave Equation and Spherical Harmonics Expansion

For a more detailed description of Ambisonics, in the following a spherical coordinate system is assumed, where a point in space $x=(r, \theta, \phi)^T$ is represented by a radius $r>0$ (i.e. the distance to the coordinate origin), an inclination angle $\theta \in [0, \pi]$ measured from the polar axis z, and an azimuth angle $\phi \in [0, 2\pi[$ measured in the x=y plane from the x axis. In this spherical coordinate system the wave equation for the sound pressure p(t, x) within a connected source-free area, where t denotes time, is given by the textbook of Earl G. Williams, "Fourier Acoustics", vol. 93 of Applied Mathematical Sciences, Academic Press, 1999:

$$\frac{1}{r^2}\left[\frac{\partial}{\partial r}\left(r^2\frac{\partial p(t,x)}{\partial r}\right)+\frac{1}{\sin\theta}\frac{\partial}{\partial\theta}\left(\sin\theta\frac{\partial_p(t,x)}{\partial\theta}\right)+\frac{1}{\sin^2\theta}\frac{\partial^2 p(t,x)}{\partial\phi^2}\right]-\frac{1}{c_s^2}\frac{1\partial^2 p(t,x)}{\partial L^2}=0 \quad (1)$$

with $c_s$ indicating the speed of sound. As a consequence, the Fourier transform of the sound pressure with respect to time $$P(\omega, x) := \mathcal{F}_t\{p(t, x)\} \quad (2)$$

$$:= \int_{-\infty}^{\infty} p(t, x)e^{-i\omega t}dt, \quad (3)$$

where i denotes the imaginary unit, may be expanded into the series of SH according to the Williams textbook:

$$P(kc_s, (r, \theta, \phi)^T) = \sum_{n=0}^{\infty}\sum_{m=-n}^{n} p_n^m(kr)Y_n^m(\theta, \phi). \quad (4)$$

It should be noted that this expansion is valid for all points x within a connected source-free area, which corresponds to the region of convergence of the series.

In eq. (4), k denotes the angular wave number defined by $$k := \frac{\omega}{c_s} \quad (5)$$

and $p_n^m(kr)$ indicates the SH expansion coefficients, which depend only on the product kr.

Further, $Y_n^m(\theta, \phi)$ are the SH functions of order n and degree m:

$$Y_n^m(\theta, \phi) := \sqrt{\frac{(2n+1)}{4\pi}\frac{(n-m)!}{(n+m)!}}P_n^m(\cos\theta)e^{im\phi}, \quad (6)$$

where $P_n^m(\cos\theta)$ denote the associated Legendre functions and $(\cdot)!$ indicates the factorial.

The associated Legendre functions for non-negative degree indices m are defined through the Legendre polynomials $P_n(x)$ by $$P_n^m(x) := (-1)^m(1-x^2)^{\frac{m}{2}}\frac{d^m}{dx^m}P_n(x) \quad \text{for } m \geq 0. \quad (7)$$

For negative degree indices, i.e. $m<0$, the associated Legendre functions are defined by $$P_n^m(x) := (-1)^m\frac{(n+m)!}{(n-m)!}P_n^{-m}(x) \quad \text{for } m < 0. \quad (8)$$

The Legendre polynomials $P_n(x)$ $(n \geq 0)$ in turn can be defined using the Rodrigues' Formula as $$P_n(x) = \frac{1}{2^n n!}\frac{d^n}{dx^n}(x^2-1)^n. \quad (9)$$

In the prior art, e.g. in M. Poletti, "Unified Description of Ambisonics using Real and Complex Spherical Harmonics", Proceedings of the Ambisonics Symposium 2009, 25-27 Jun. 2009, Graz, Austria, there also exist definitions of the SH functions which deviate from that in eq. (6) by a factor of $(-1)^m$ for negative degree indices m.

Alternatively, the Fourier transform of the sound pressure with respect to time can be expressed using real SH functions $S_n^m(\theta, \phi)$ as $$P(kc_s, (r, \theta, \phi)^T) = \sum_{n=0}^{\infty}\sum_{m=-n}^{n} q_n^m(kr)S_n^m(\theta, \phi). \quad (10)$$

In literature, there exist various definitions of the real SH functions (see e.g. the above-mentioned Poletti article). One possible definition, which is applied throughout this document, is given by $$S_n^m(\theta, \phi) := \begin{cases} \frac{(-1)^m}{\sqrt{2}}[Y_n^m(\theta, \phi) + Y_n^{m*}(\theta, \phi)] & \text{for } m > 0 \\ Y_n^m(\theta, \phi) & \text{for } m = 0, \\ \frac{(-1)}{\sqrt{2}}[Y_n^m(\theta, \phi) - Y_n^{m*}(\theta, \phi)] & \text{for } m < 0 \end{cases} \quad (11)$$

where $(\cdot)^*$ denotes complex conjugation. An alternative expression is obtained by inserting eq. (6) into eq. (11):

$$S_n^m(\theta, \phi) = \sqrt{\frac{(2n+1)}{4\pi}\frac{(n-m)!}{(n+m)!}}P_n^m(\cos\theta)trg_m(\phi), \quad (12)$$

with $$trg_m(\phi) := \begin{cases} (-1)^m\sqrt{2}\cos(m\phi) & \text{for } m > 0 \\ 1 & \text{for } m = 0, \\ -\sqrt{2}\sin(m\phi) & \text{for } m < 0 \end{cases} \quad (13)$$

Although the real SH functions are real-valued per definition, this does not hold for the corresponding expansion coefficients $q_n^m(kr)$ in general.

The complex SH functions are related to the real SH functions as follows:

$$Y_n^m(\theta, \phi) = \begin{cases} \frac{q_n^m(kr)}{\sqrt{2}}[S_n^m(\theta, \phi) + iS_n^{-m}(\theta, \phi)] & \text{for } m > 0 \\ S_n^0(\theta, \phi) & \text{for } m = 0. \\ \frac{1}{i\sqrt{2}}[S_n^m(\theta, \phi) + iS_n^{-m}(\theta, \phi)] & \text{for } m < 0 \end{cases} \quad (14)$$

The complex SH functions $Y_n^m(\theta, \phi)$ as well as the real SH functions $S_n^m(\theta, \phi)$ with the direction vector $\Omega := (\theta, \phi)^T$ form an orthonormal basis for squared integrable complex valued functions on the unit sphere $\mathcal{S}^2$ in the three-dimensional space, and thus obey the conditions $$\int_{S^2} Y_n^m(\Omega) Y_{n'}^{m'*}(\Omega) d\Omega = \int_0^{2\pi}\int_0^{\pi} Y_n^m(\theta,\phi) Y_{n'}^{m'*}(\theta,\phi)\sin\theta d\theta d\phi = \delta_{n-n'}\delta_{m-m'} \tag{15}$$

$$\int_{S^2} S_n^m(\Omega) S_{n'}^{m'}(\Omega) d\Omega = \delta_{n-n'}\delta_{m-m'}, \tag{16}$$

where $\delta$ denotes the Kronecker delta function. The second result can be derived using eq. (15) and the definition of the real spherical harmonics in eq. (11).

Interior Problem and Ambisonics Coefficients

The purpose of Ambisonics is a representation of a sound field in the vicinity of the coordinate origin. Without loss of generality, this region of interest is here assumed to be a ball of radius R centred in the coordinate origin, which is specified by the set $\{x|0\le r\le R\}$. A crucial assumption for the representation is that this ball is supposed to not contain any sound sources. Finding the representation of the sound field within this ball is termed the 'interior problem', cf. the above-mentioned Williams textbook.

It can be shown that for the interior problem the SH functions expansion coefficients $p_n^m(kr)$ can be expressed as $$p_n^m(kr)=a_n^m(k)j_n(kr), \tag{17}$$

where $j_n(\cdot)$ denote the spherical Bessel functions of first order. From eq. (17) it follows that the complete information about the sound field is contained in the coefficients $a_n^m(k)$, which are referred to as Ambisonics coefficients.

Similarly, the coefficients of the real SH functions expansion $q_n^m(kr)$ can be factorised as $$q_n^m(kr)=b_n^m(k)j_n(kr), \tag{18}$$

where the coefficients $b_n^m(k)$ are referred to as Ambisonics coefficients with respect to the expansion using real-valued SH functions. They are related to $a_n^m(k)$ through $$b_n^m(k) := \begin{cases} \frac{1}{\sqrt{2}}[(-1)^m a_n^m(k) + a_n^{-m}(k)] & \text{for } m>0 \\ a_n^0(k) & \text{for } m=0\,. \\ \frac{1}{i\sqrt{2}}[a_n^m(k) - (-1)^m a_n^{-m}(k)] & \text{for } m<0 \end{cases} \tag{19}$$

Plane Wave Decomposition

The sound field within a sound source-free ball centred in the coordinate origin can be expressed by a superposition of an infinite number of plane waves of different angular wave numbers k, impinging on the ball from all possible directions, cf. the above-mentioned Rafaely "Plane-wave decomposition . . . " article. Assuming that the complex amplitude of a plane wave with angular wave number k from the direction $\Omega_0$ is given by $D(k, \Omega_0)$, it can be shown in a similar way by using eq. (11) and eq. (19) that the corresponding Ambisonics coefficients with respect to the real SH functions expansion are given by $$b_{n,plane\ wave}^m(k;\Omega_0)=4\pi i^n D(k,\Omega_0)S_n^m(\Omega_0). \tag{20}$$

Consequently, the Ambisonics coefficients for the sound field resulting from a superposition of an infinite number of plane waves of angular wave number k are obtained from an integration of eq. (20) over all possible directions $\Omega_0\in \mathcal{S}^2$:

$$b_n^m(k) = \int_{\mathcal{S}^2} b_{n,plane\ wave}^m(k;\Omega_0)d\Omega_0 \tag{21}$$

$$= 4\pi i^n \int_{\mathcal{S}^2} D(k,\Omega_0)S_n^m(\Omega_0)d\Omega_0. \tag{22}$$

The function $D(k, \Omega)$ is termed 'amplitude density' and is assumed to be square integrable on the unit sphere $\mathcal{S}^2$. It can be expanded into the series of real SH functions as $$D(k,\Omega)=\sum_{n=0}^{\infty}\sum_{m=-n}^{n} c_n^m(k)S_n^m(\Omega), \tag{23}$$

where the expansion coefficients $c_n^m(k)$ are equal to the integral occurring in eq. (22), i.e.

$$c_n^m(k)=\int_{S^2} D(k,\Omega)S_n^m(\Omega)d\Omega. \tag{24}$$

By inserting eq. (24) into eq. (22) it can be seen that the Ambisonics coefficients $b_n^m(k)$ are a scaled version of the expansion coefficients $c_n^m(k)$, i.e.

$$b_n^m(k)=4\pi i^n c_n^m(k). \tag{25}$$

When applying the inverse Fourier transform with respect to time to the scaled Ambisonics coefficients $c_n^m(k)$ and to the amplitude density function $D(k, \Omega)$, the corresponding time domain quantities $$\tilde{c}_n^m(t) := \mathcal{F}_t^{-1}\left\{c_n^m\left(\frac{\omega}{c_s}\right)\right\} = \frac{1}{2\pi}\int_{-\infty}^{\infty} c_n^m\left(\frac{\omega}{c_s}\right)e^{i\omega L}d\omega \tag{26}$$

$$d(t,\Omega) := \mathcal{F}_t^{-1}\left\{D\left(\frac{\omega}{c_s},\Omega\right)\right\} = \frac{1}{2\pi}\int_{-\infty}^{\infty} D\left(\frac{\omega}{c_s},\Omega\right)e^{i\omega L}d\omega \tag{27}$$

are obtained. Then, in the time domain, eq. (24) can be formulated as $$\tilde{c}_n^m(t)=\int_{S^2} d(t,\Omega)S_n^m(\Omega)d\Omega. \tag{28}$$

The time domain directional signal $d(t, \Omega)$ may be represented by a real SH function expansion according to $$d(t,\Omega)=\sum_{n=0}^{\infty}\sum_{m=-n}^{n}\tilde{c}_n^m(t)S_n^m(\Omega). \tag{29}$$

Using the fact that the SH functions $S_n^m(\Omega)$ are real-valued, its complex conjugate can be expressed by $$d^*(t,\Omega)=\sum_{n=0}^{\infty}\sum_{m=-n}^{n}\tilde{c}_n^{m*}(t)S_n^m(\Omega). \tag{30}$$

Assuming the time domain signal $d(t, \Omega)$ to be real-valued, i.e. $d(t, \Omega)=d^*(t, \Omega)$, it follows from the comparison of eq. (29) with eq. (30) that the coefficients $\tilde{c}_n^{m*}(t)$ are real-valued in that case, i.e. $\tilde{c}_n^m(t)=\tilde{c}_n^{m*}(t)$.

The coefficients $\tilde{c}_n^m(t)$ will be referred to as scaled time domain Ambisonics coefficients in the following.

In the following it is also assumed that the sound field representation is given by these coefficients, which will be described in more detail in the below section dealing with the compression.

It is noted that the time domain HOA representation by the coefficients $\tilde{c}_n^m(t)$ used for the processing according to the invention is equivalent to a corresponding frequency domain HOA representation $c_n^m(k)$. Therefore, the described compression and decompression can be equivalently realised in the frequency domain with minor respective modifications of the equations.

Spatial Resolution With Finite Order

In practice the sound field in the vicinity of the coordinate origin is described using only a finite number of Ambisonics coefficients $c_n^m(k)$ of order $n \le N$. Computing the amplitude density function from the truncated series of SH functions according to $$D_N(k, \Omega) := \sum_{n=0}^{N} \sum_{m=-n}^{n} c_n^m(k) S_n^m(\Omega) \tag{31}$$

introduces a kind of spatial dispersion compared to the true amplitude density function D(k, Ω), cf. the above-mentioned "Plane-wave decomposition . . . " article. This can be realised by computing the amplitude density function for a single plane wave from the direction $\Omega_0$ using eq. (31):

$$\begin{aligned}
D_N(k, \Omega) &= \sum_{n=0}^{N} \sum_{m=-n}^{n} \frac{1}{4\pi i^n n} \cdot b_{n,plane\ wave}^m(k; \Omega_0) S_n^m(\Omega) && (32)\\
&= D(k, \Omega_0) \sum_{n=0}^{N} \sum_{m=-n}^{n} S_n^m(\Omega_0) S_n^m(\Omega) && (33)\\
&= D(k, \Omega_0) \sum_{n=0}^{N} \sum_{m=-n}^{n} Y_n^{m*}(\Omega_0) Y_n^m(\Omega) && (34)\\
&= D(k, \Omega_0) \sum_{n=0}^{N} \frac{2n+1}{4\pi} P_n(\cos\Theta) && (35)\\
&= D(k, \Omega_0) \left[\frac{N+1}{4\pi(\cos\Theta - 1)} (P_{N+1}(\cos\Theta) - P_N(\cos\Theta))\right] && (36)\\
&= D(k, \Omega_0) v_N(\Theta) && (37)
\end{aligned}$$

with $$v_N(\Theta) := \frac{N+1}{4\pi(\cos\Theta - 1)} (P_{N+1}(\cos\Theta) - P_N(\cos\Theta)), \tag{38}$$

where Θ denotes the angle between the two vectors pointing towards the directions Ω and $\Omega_0$ satisfying the property $$\cos\Theta = \cos\theta \cos\theta_0 + \cos(\phi - \phi_0) \sin\theta \sin\theta_0. \tag{39}$$

In eq. (34) the Ambisonics coefficients for a plane wave given in eq. (20) are employed, while in equations (35) and (36) some mathematical theorems are exploited, cf. the above-mentioned "Plane-wave decomposition . . . " article. The property in eq. (33) can be shown using eq. (14).

Comparing eq. (37) to the true amplitude density function $$D(k, \Omega) = D(k, \Omega_0) \frac{\delta(\theta)}{2\pi}, \tag{40}$$

where δ(·) denotes the Dirac delta function, the spatial dispersion becomes obvious from the replacement of the scaled Dirac delta function by the dispersion function $v_N(\Theta)$ which, after having been normalised by its maximum value, is illustrated in FIG. 1 for different Ambisonics orders N and angles $\Theta \in [0, \pi]$.

Because the first zero of $v_N(\Theta)$ is located approximately at π/N for N≥4 (see the above-mentioned "Plane-wave decomposition . . . " article), the dispersion effect is reduced (and thus the spatial resolution is improved) with increasing Ambisonics order N.

For $N \to \infty$ the dispersion function $v_N(\Theta)$ converges to the scaled Dirac delta function. This can be seen if the completeness relation for the Legendre polynomials $$\sum_{n=0}^{\infty} \frac{2n+1}{2} P_n(x) P_n(x') = \delta(x - x') \tag{41}$$

is used together with eq. (35) to express the limit of $v_N(\Theta)$ for $N \to \infty$ as $$\begin{aligned}
\lim_{N\to\infty} v_N(\Theta) &= \frac{1}{2\pi} \sum_{n=0}^{\infty} \frac{2n+1}{2} P_n(\cos\Theta) = && (42)\\
&\frac{1}{2\pi} \sum_{n=0}^{\infty} \frac{2n+1}{2} P_n(\cos\Theta) P_n(1) = && (43)\\
&\frac{1}{2\pi} \delta(\cos\Theta - 1) = && (44)\\
&\frac{1}{2\pi} \delta(\Theta). && (45)
\end{aligned}$$

When defining the vector of real SH functions of order n≤N by $$(\Omega) := (S_0^0(\Omega), S_1^{-1}(\Omega), S_1^0(\Omega), S_1^1(\Omega), S_2^{-2}(\Omega), S_N^N(\Omega))^T \in \mathbb{R}^O, \tag{46}$$

where $O = (N+1)^2$ and where $(\cdot)^T$ denotes transposition, the comparison of eq. (37) with eq. (33) shows that the dispersion function can be expressed through the scalar product of two real SH vectors as $$v_N(\Theta) = S^T(\Omega) S(\Omega_0). \tag{47}$$

The dispersion can be equivalently expressed in time domain as $$\begin{aligned}
d_N(t, \Omega) := \sum_{n=0}^{N} \sum_{m=-n}^{n} \tilde{c}_n^m(t) S_n^m(\Omega) = && (48)\\
d(t, \Omega_0) v_N(\Theta). && (49)
\end{aligned}$$

Sampling

For some applications it is desirable to determine the scaled time domain Ambisonics coefficients $\tilde{c}_n^m(t)$ from the samples of the time domain amplitude density function d(t, Ω) at a finite number J of discrete directions $\Omega_j$. The integral in eq. (28) is then approximated by a finite sum according to B. Rafaely, "Analysis and Design of Spherical Microphone Arrays", IEEE Transactions on Speech and Audio Processing, vol. 13, no. 1, pp. 135-143, January 2005:

$$\tilde{c}_n^m(t) \approx \sum_{j=1}^{J} g_j \cdot d(t, \Omega_j) S_n^m(\Omega_j), \tag{50}$$

where the $g_j$ denote some appropriately chosen sampling weights. In contrast to the "Analysis and Design . . . " article, approximation (50) refers to a time domain representation using real SH functions rather than to a frequency domain representation using complex SH functions. A necessary condition for approximation (50) to become exact is that the amplitude density is of limited harmonic order N, meaning that $$\tilde{c}_n^m(t) = 0 \text{ for } n > N. \tag{51}$$

If this condition is not met, approximation (50) suffers from spatial aliasing errors, cf. B. Rafaely, "Spatial Aliasing in Spherical Microphone Arrays", IEEE Transactions on Signal Processing, vol. 55, no. 3, pp. 1003-1010, March 2007.

A second necessary condition requires the sampling points $\Omega_j$ and the corresponding weights to fulfil the corresponding conditions given in the "Analysis and Design . . . " article:

$$\sum_{j=1}^{J} g_j S_{n'}^{m'}(\Omega_j) S_n^m(\Omega_j) = \delta_{n-n'} \delta_{m-m'} \text{ for } m, m' \le N. \tag{52}$$

The conditions (51) and (52) jointly are sufficient for exact sampling.

The sampling condition (52) consists of a set of linear equations, which can be formulated compactly using a single matrix equation as $$\Psi^{H}=I, \tag{53}$$

where Ψ indicates the mode matrix defined by $$\Psi:=[S(\Omega_1) \ldots S(\Omega_J)]\in \mathbb{R}^{O\times J} \tag{54}$$

and G denotes the matrix with the weights on its diagonal, i.e.

$$G:=\mathrm{diag}(g_1, g_J). \tag{55}$$

From eq. (53) it can be seen that a necessary condition for eq. (52) to hold is that the number J of sampling points fulfils J≥0. Collecting the values of the time domain amplitude density at the J sampling points into the vector $$w(t):=(D(t, \Omega_1), \ldots, D(t, \Omega_J))^T, \tag{56}$$

and defining the vector of scaled time domain Ambisonics coefficients by $$c(t):=(\tilde{c}_0^{\,0}(t), \tilde{c}_1^{\,-1}(t), \tilde{c}_1^{\,0}(t), \tilde{c}_1^{\,1}(t), \tilde{c}_2^{\,-2}(t), \tilde{c}_O^{\,O}(t))^T, \tag{57}$$

both vectors are related through the SH functions expansion (29). This relation provides the following system of linear equations:

$$(t)=\Psi^{H}c(t). \tag{58}$$

Using the introduced vector notation, the computation of the scaled time domain Ambisonics coefficients from the values of the time domain amplitude density function samples can be written as $$(t)\approx\Psi Gw(t). \tag{59}$$

Given a fixed Ambisonics order N, it is often not possible to compute a number J≥O of sampling points $\Omega_j$ and the corresponding weights such that the sampling condition eq. (52) holds. However, if the sampling points are chosen such that the sampling condition is well approximated, then the rank of the mode matrix Ψ is O and its condition number low. In this case, the pseudo-inverse $$\Psi^{+}:=(\Psi\Psi^{H})^{-1}\Psi\Psi^{+} \tag{60}$$

of the mode matrix Ψ exists and a reasonable approximation of the scaled time domain Ambisonics coefficient vector c(t) from the vector of the time domain amplitude density function samples is given by $$c(t)\approx\Psi^{+}w(t). \tag{61}$$

If J=O and the rank of the mode matrix is O, then its pseudo-inverse coincides with its inverse since $$\Psi^{+}=(\Psi\Psi^{H})^{-1}\Psi=\Psi^{-H}\Psi^{-1}\Psi=\Psi^{-H}. \tag{62}$$

If additionally the sampling condition eq. (52) is satisfied, then $$\Psi^{-H}=\Psi G \tag{63}$$

holds and both approximations (59) and (61) are equivalent and exact.

Vector w(t) can be interpreted as a vector of spatial time domain signals. The transform from the HOA domain to the spatial domain can be performed e.g. by using eq. (58). This kind of transform is termed 'Spherical Harmonic Transform' (SHT) in this application and is used when the ambient HOA component of reduced order is transformed to the spatial domain. It is implicitly assumed that the spatial sampling points $\Omega_j$ for the SHT approximately satisfy the sampling condition in eq. (52) with $$g_j \approx \frac{4\pi}{O}$$

for j=1, . . . , J and that J=O. Under these assumptions the SHT matrix satisfies $$\Psi^{H} \approx \frac{4\pi}{O}\Psi^{-1}.$$

In case the absolute scaling for the SHT not being important, the constant $$\frac{4\pi}{O}$$

can be neglected.

Compression

This invention is related to the compression of a given HOA signal representation. As mentioned above, the HOA representation is decomposed into a predefined number of dominant directional signals in the time domain and an ambient component in HOA domain, followed by compression of the HOA representation of the ambient component by reducing its order. This operation exploits the assumption, which is supported by listening tests, that the ambient sound field component can be represented with sufficient accuracy by a HOA representation with a low order. The extraction of the dominant directional signals ensures that, following that compression and a corresponding decompression, a high spatial resolution is retained.

After the decomposition, the ambient HOA component of reduced order is transformed to the spatial domain, and is perceptually coded together with the directional signals as described in section Exemplary embodiments of patent application EP 10306472.1.

Figure 2:
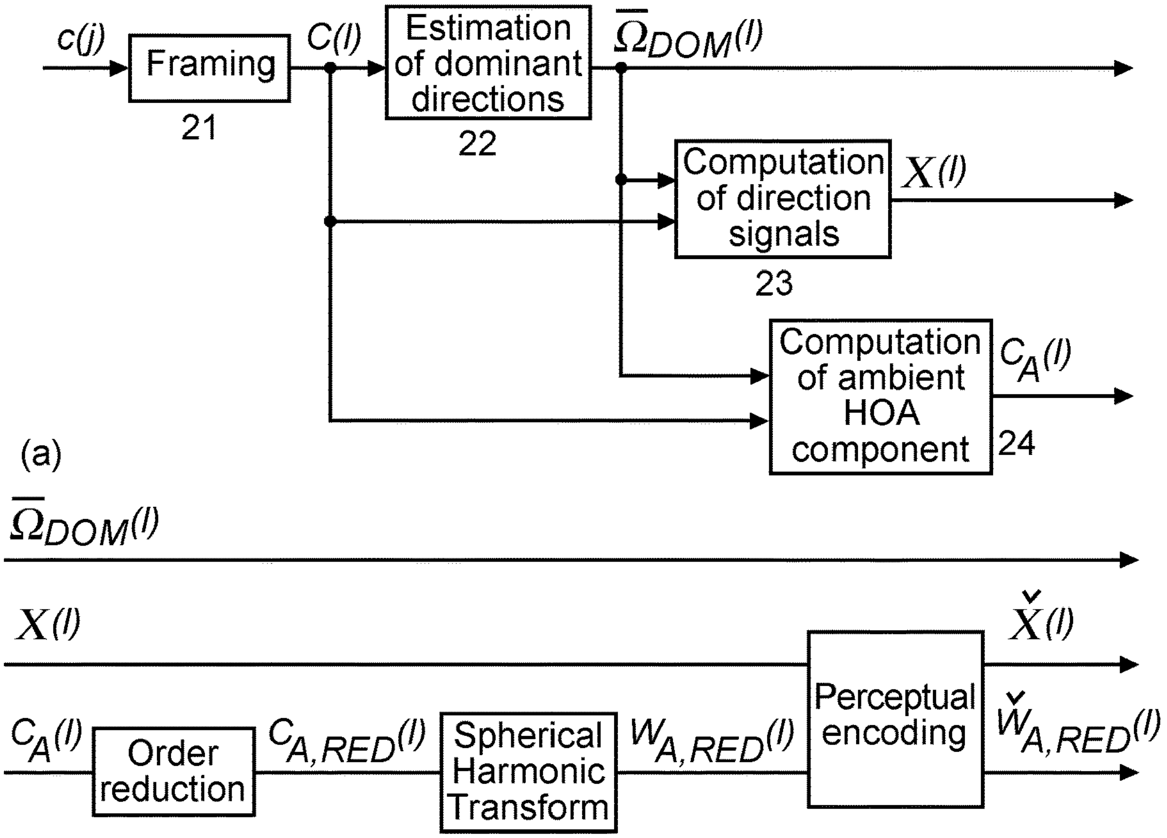
FIG. 2 illustrates a block diagram of the compression processing according to the invention.

The compression processing includes two successive steps, which are depicted in FIG. 2. The exact definitions of the individual signals are described in below section Details of the compression.

In the first step or stage shown in FIG. 2*a*, in a dominant direction estimator 22 dominant directions are estimated and a decomposition of the Ambisonics signal C(l) into a directional and a residual or ambient component is performed, where l denotes the frame index. The directional component is calculated in a directional signal computation step or stage 23, whereby the Ambisonics representation is converted to time domain signals represented by a set of D conventional directional signals X(l) with corresponding directions $\overline{\Omega}_{DOM}(l)$. The residual ambient component is calculated in an ambient HOA component computation step or stage 24, and is represented by HOA domain coefficients $C_A(l)$.

In the second step shown in FIG. 2*b*, a perceptual coding of the directional signals X(l) and the ambient HOA component $C_A(l)$ is carried out as follows:

- The conventional time domain directional signals X(l) can be individually compressed in a perceptual coder 27 using any known perceptual compression technique.
- The compression of the ambient HOA domain component $C_A(l)$ is carried out in two sub steps or stages.

The first substep or stage 25 performs a reduction of the original Ambisonics order N to $N_{RED}$, e.g. $N_{RED}=2$, resulting in the ambient HOA component $C_{A,RED}(l)$. Here, the assumption is exploited that the ambient sound field component can be represented with sufficient accuracy by HOA with a low order. The second substep or stage 26 is based on a compression described in patent application EP 10306472.1. The $O_{RED}:=(N_{RED}+1)^2$ HOA signals $C_{A,RED}(l)$ of the ambient sound field component, which were computed at substep/stage 25, are transformed into $O_{RED}$ equivalent signals $W_{A,RED}(l)$ in the spatial domain by applying a Spherical Harmonic Transform, resulting in conventional time domain signals which can be input to a bank of parallel perceptual codecs 27. Any known perceptual coding or compression technique can be applied. The encoded directional signals $\check{X}(l)$ and the order-reduced encoded spatial domain signals $\check{W}_{A,RED}(l)$ are output and can be transmitted or stored.

Advantageously, the perceptual compression of all time domain signals X(l) and $W_{A,RED}(l)$ can be performed jointly in a perceptual coder 27 in order to improve the overall coding efficiency by exploiting the potentially remaining inter-channel correlations.

Decompression

Figure 3:
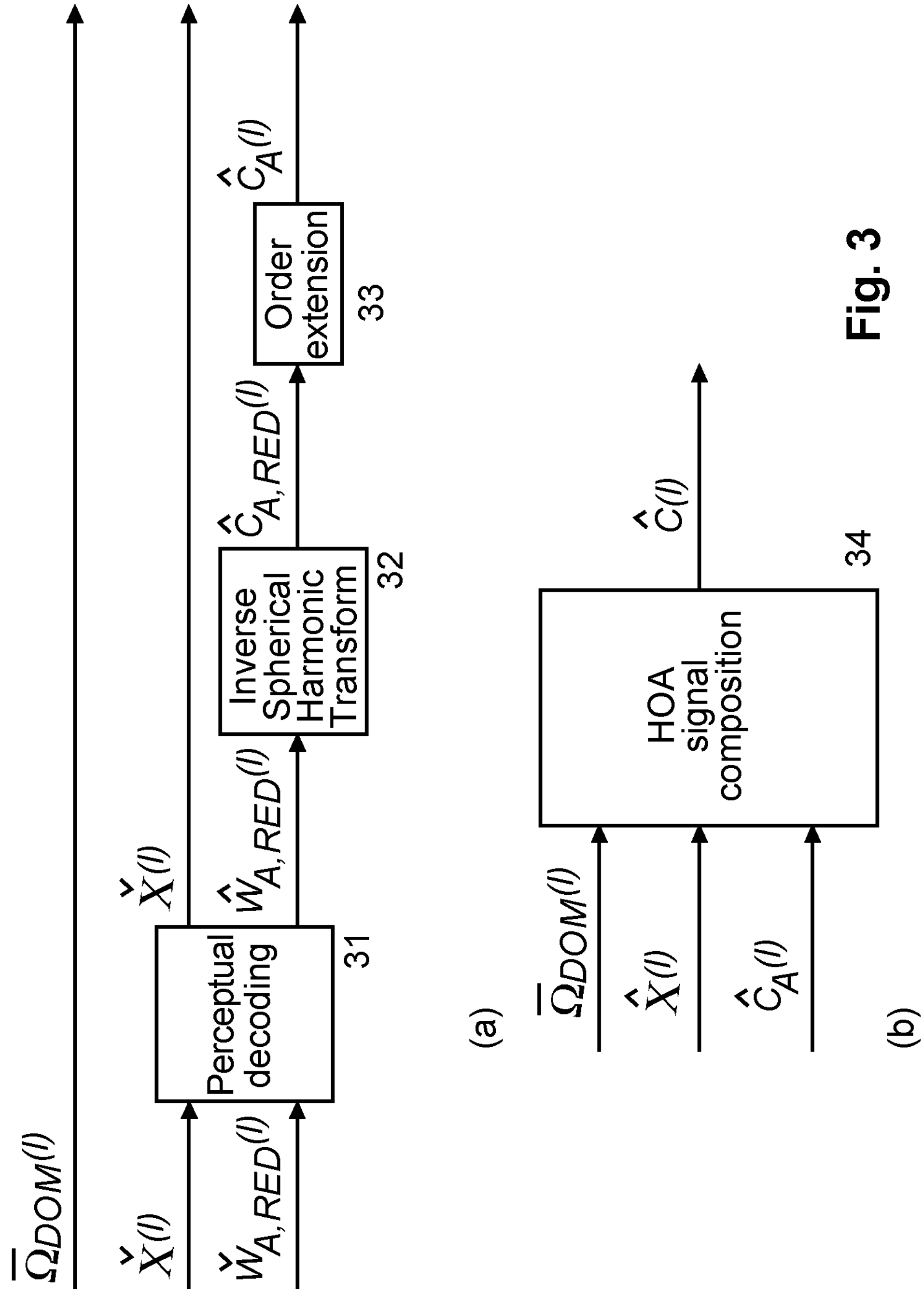
FIG. 3 illustrates a block diagram of the decompression processing according to the invention.

The decompression processing for a received or replayed signal is depicted in FIG. 3. Like the compression processing, it includes two successive steps.

In the first step or stage shown in FIG. 3*a*, in a perceptual decoding 31 a perceptual decoding or decompression of the encoded directional signals $\check{X}(l)$ and of the order-reduced encoded spatial domain signals $\check{W}_{A,RED}(l)$ is carried out, where $\hat{X}(l)$ is the represents component and $\check{W}_{A,RED}(l)$ represents the ambient HOA component. The perceptually decoded or decompressed spatial domain signals $\hat{W}_{A,RED}(l)$ are transformed in an inverse spherical harmonic transformer 32 to an HOA domain representation $\hat{C}_{A,RED}(l)$ of order $N_{RED}$ via an inverse Spherical Harmonics transform. Thereafter, in an order extension step or stage 33 an appropriate HOA representation $\hat{C}_A(l)$ of order N is estimated from $\hat{C}_{A,RED}(l)$ by order extension.

In the second step or stage shown in FIG. 3*b*, the total HOA representation $\hat{C}(l)$ is re-composed in an HOA signal assembler 34 from the directional signals $\hat{X}(l)$ and the corresponding direction information $\overline{\Omega}_{DOM}(l)$ as well as from the original-order ambient HOA component $\hat{C}_A(l)$.

Achievable Data Rate Reduction

A problem solved by the invention is the considerable reduction of the data rate as compared to existing compression methods for HOA representations. In the following the achievable compression rate compared to the non-compressed HOA representation is discussed. The compression rate results from the comparison of the data rate required for the transmission of a non-compressed HOA signal C(l) of order N with the data rate required for the transmission of a compressed signal representation consisting of D perceptually coded directional signals X(l) with corresponding directions $\overline{\Omega}_{DOM}(l)$ and $N_{RED}$ perceptually coded spatial domain signals $W_{A,RED}(l)$ representing the ambient HOA component.

For the transmission of the non-compressed HOA signal C(l) a data rate of $O\cdot f_s\cdot N_b$ is required. On the contrary, the transmission of D perceptually coded directional signals X(l) requires a data rate of $D\cdot f_{b,COD}$, where $f_{b,COD}$ denotes the bit rate of the perceptually coded signals. Similarly, the transmission of the $N_{RED}$ perceptually coded spatial domain signals $W_{A,RED}(l)$ signals requires a bit rate of $O_{RED}\cdot f_{b,COD}$. The directions $\overline{\Omega}_{DOM}(l)$ are assumed to be computed based on a much lower rate compared to the sampling rate $f_s$, i.e. they are assumed to be fixed for the duration of a signal frame consisting of B samples, e.g. B=1200 for a sampling rate of $f_s$=48 kHz, and the corresponding data rate share can be neglected for the computation of the total data rate of the compressed HOA signal.

Therefore, the transmission of the compressed representation requires a data rate of approximately $(D+O_{RED})\cdot f_{b,COD}$. Consequently, the compression rate $r_{COMPR}$ is $$r_{COMPR} \approx \frac{O\cdot f_S\cdot N_b}{(D+O_{RED})\cdot f_{b,COD}}. \quad (64)$$

For example, the compression of an HOA representation of order N=4 employing a sampling rate $f_s$=48 kHz and $N_b$=16 bits per sample to a representation with D=3 dominant directions using a reduced HOA order $N_{RED}$=2 and a bit rate of $$64\frac{kbits}{s}$$

will result in a compression rate of $r_{COMPR}\approx 25$. The transmission of the compressed representation requires a data rate of approximately $$768\frac{kbits}{s}.$$

Reduced Probability for Occurrence of Coding Noise Unmasking

As explained in the Background section, the perceptual compression of spatial domain signals described in patent application EP 10306472.1 suffers from remaining cross correlations between the signals, which may lead to unmasking of perceptual coding noise. According to the invention, the dominant directional signals are first extracted from the HOA sound field representation before being perceptually coded. This means that, when composing the HOA representation, after perceptual decoding the coding noise has exactly the same spatial directivity as the directional signals. In particular, the contributions of the coding noise as well as that of the directional signal to any arbitrary direction is deterministically described by the spatial dispersion function explained in section Spatial resolution with finite order. In other words, at any time instant the HOA coefficients vector representing the coding noise is exactly a multiple of the HOA coefficients vector representing the directional signal. Thus, an arbitrarily weighted sum of the noisy HOA coefficients will not lead to any unmasking of the perceptual coding noise.

Further, the ambient component of reduced order is processed exactly as proposed in EP 10306472.1, but because per definition the spatial domain signals of the ambient component have a rather low correlation between each other, the probability for perceptual noise unmasking is low.

Improved Direction Estimation

The inventive direction estimation is dependent on the directional power distribution of the energetically dominant HOA component. The directional power distribution is computed from the rank-reduced correlation matrix of the HOA representation, which is obtained by eigenvalue decomposition of the correlation matrix of the HOA representation.

Compared to the direction estimation used in the above-mentioned "Plane-wave decomposition . . . " article, it offers the advantage of being more precise, since focusing on the energetically dominant HOA component instead of using the complete HOA representation for the direction estimation reduces the spatial blurring of the directional power distribution.

Compared to the direction estimation proposed in the above-mentioned "The Application of Compressive Sampling to the Analysis and Synthesis of Spatial Sound Fields" and "Time Domain Reconstruction of Spatial Sound Fields Using Compressed Sensing" articles, it offers the advantage of being more robust. The reason is that the decomposition of the HOA representation into the directional and ambient component can hardly ever be accomplished perfectly, so that there remains a small ambient component amount in the directional component. Then, compressive sampling methods like in these two articles fail to provide reasonable direction estimates due to their high sensitivity to the presence of ambient signals.

Advantageously, the inventive direction estimation does not suffer from this problem.

Alternative Applications of the HOA Representation Decomposition

The described decomposition of the HOA representation into a number of directional signals with related direction information and an ambient component in HOA domain can be used for a signal-adaptive DirAC-like rendering of the HOA representation according to that proposed in the above-mentioned Pulkki article "Spatial Sound Reproduction with Directional Audio Coding".

Each HOA component can be rendered differently because the physical characteristics of the two components are different. For example, the directional signals can be rendered to the loudspeakers using signal panning techniques like Vector Based Amplitude Panning (VBAP), cf. V. Pulkki, "Virtual Sound Source Positioning Using Vector Base Amplitude Panning", Journal of Audio Eng. Society, vol. 45, no. 6, pp. 456-466, 1997. The ambient HOA component can be rendered using known standard HOA rendering techniques.

Such rendering is not restricted to Ambisonics representation of order '1' and can thus be seen as an extension of the DirAC-like rendering to HOA representations of order N>1.

The estimation of several directions from an HOA signal representation can be used for any related kind of sound field analysis.

The following sections describe in more detail the signal processing steps.

Compression

Definition of Input Format

As input, the scaled time domain HOA coefficients $\tilde{c}_n^m(t)$ defined in eq. (26) are assumed to be sampled at a rate $$f_S = \frac{1}{T_S}.$$

A vector c(j) is defined to be composed of all coefficients belonging to the sampling time $t=jT_S$, $j\in\mathbb{Z}$, according to $$c(j):=[\tilde{c}_0^0(jT_S), \tilde{c}_1^{-1}(jT_S), \tilde{c}_1^0(jT_S), \tilde{c}_1^1(jT_S), \tilde{c}_2^{-2}(jT_S), \tilde{c}_N^N(jT_S)]^T\in\mathbb{R}^O. \tag{65}$$

Framing

The incoming vectors c(j) of scaled HOA coefficients are framed in framing step or stage 21 into non-overlapping frames of length B according to $$C(l):=[c(lB+1)c(lB+2)\ldots c(lB+B)]\in\mathbb{R}^{O\times B}. \tag{66}$$

Assuming a sampling rate of $f_S$=48 kHz, an appropriate frame length is B=1200 samples corresponding to a frame duration of 25 ms.

Estimation of Dominant Directions

For the estimation of the dominant directions the following correlation matrix $$B(l) := \frac{1}{LB}\sum_{l'=0}^{L-1} C(l-l')C^T(l-l') \in \mathbb{R}^{O\times O}. \tag{67}$$

is computed. The summation over the current frame l and L−1 previous frames indicates that the directional analysis is based on long overlapping groups of frames with L·B samples, i.e. for each current frame the content of adjacent frames is taken into consideration. This contributes to the stability of the directional analysis for two reasons: longer frames are resulting in a greater number of observations, and the direction estimates are smoothed due to overlapping frames.

Assuming $f_S$=48 kHz and B=1200, a reasonable value for L is 4 corresponding to an overall frame duration of 100 ms.

Next, an eigenvalue decomposition of the correlation matrix B(l) is determined according to $$(l)=V(l)\Lambda(l)V^T(l), \tag{68}$$

wherein matrix V(l) is composed of the eigenvectors $v_i(l)$, 1≤i≤O, as $$V(l):=[v_1(l)v_2(l)\ldots v_O(l)]\in\mathbb{R}^{O\times O} \tag{69}$$

and matrix Λ(l) is a diagonal matrix with the corresponding eigenvalues $\lambda_i(l)$, 1≤i≤O, on its diagonal:

$$\Lambda(l):=\mathrm{diag}(\lambda_1(l), \lambda_2(l), \ldots, \lambda_O(l))\in\mathbb{R}^{O\times O}. \tag{70}$$

It is assumed that the eigenvalues are indexed in a non-ascending order, i.e.

$$\lambda_1(l)\geq\lambda_2(l)\geq\ldots\geq\lambda_O(l). \tag{71}$$

Thereafter, the index set {1, . . . , $\tilde{\mathcal{J}}$(l)} of dominant eigenvalues is computed. One possibility to manage this is defining a desired minimal broadband directional-to-ambient power ratio $DAR_{MIN}$ and then determining $\tilde{\mathcal{J}}$(l) such that $$10\log_{10}\left(\frac{\lambda_i(l)}{\lambda_1(l)}\right) \geq -DAR_{MIN} \forall\, i \leq \tilde{\mathcal{J}}(l) \text{ and}$$
$$10\log_{10}\left(\frac{\lambda_i(l)}{\lambda_1(l)}\right) > -DAR_{MIN} \text{ for } i = \tilde{\mathcal{J}}(l)+1. \tag{72}$$

A reasonable choice for $DAR_{MIN}$ is 15 dB. The number of dominant eigenvalues is further constrained to be not greater than D in order to concentrate on no more than D dominant directions. This is accomplished by replacing the index set {1, . . . , $\tilde{\mathcal{J}}$(l)} by {1, . . . , $\mathcal{J}$(l)}, where $$\mathcal{J}(l):=\max(\tilde{\mathcal{J}}(l), D). \tag{73}$$

Next, the $\mathcal{J}$(l)-rank approximation of B(l) is obtained by $$\mathbf{B}_{\mathcal{J}}(l):=\mathbf{V}_{\mathcal{J}}(l)\mathbf{\Lambda}_{\mathcal{J}}(l)\mathbf{V}_{\mathcal{J}}^T(l), \text{ where} \tag{74}$$

$$\mathbf{V}_{\mathcal{J}}(l):=[v_1(l)v_2(l)\ldots \mathbf{v}_{\mathcal{J}(l)}(l)]\in\mathbb{R}^{O\times\mathcal{J}(l)}, \tag{75}$$

$$\mathbf{\Lambda}_{\mathcal{J}}(l):=\mathrm{diag}(\lambda_1(l), \lambda_2(l), \ldots, \lambda_{\mathcal{J}(l)}(l))\in\mathbb{R}^{\mathcal{J}(l)\times\mathcal{J}(l)}. \tag{76}$$

This matrix should contain the contributions of the dominant directional components to B(l).

Thereafter, the vector $$\sigma^2(l) := \mathrm{diag}\left(\Xi^T B_{\mathcal{J}}(l)\Xi\right) \in \mathbb{R}^Q = \tag{77}$$

$$\left(S_1^T B_{\mathcal{J}}(l) S_1, \ldots, S_Q^T B_{\mathcal{J}}(l) S_Q\right)^T \tag{78}$$

is computed, where $\Xi$ denotes a mode matrix with respect to a high number of nearly equally distributed test directions $\Omega_q := (\theta_q, \phi_q)$, $1 \le q \le Q$, where $\theta_q \in [0, \pi]$ denotes the inclination angle $\theta \in [0, \pi]$ measured from the polar axis z and $\phi_q \in [-\pi, \pi[$ denotes the azimuth angle measured in the x=y plane from the x axis.

Mode matrix $\Xi$ is defined by $$\Xi := [S_1 S_2 \ldots S_Q] \in \mathbb{R}^{O \times Q} \tag{79}$$

with $$S_q := [S_0^0(\Omega_q), \quad S_1^{-1}(\Omega_q), \quad S_1^0(\Omega_q), \quad S_1^{-1}(\Omega_q), \quad S_2^{-2}(\Omega_q), \ldots, S_N^N(\Omega_q)]^T \tag{80}$$

for $1 \le q \le Q$.

The $\sigma_q^2(l)$ elements of $\sigma^2(l)$ are approximations of the powers of plane waves, corresponding to dominant directional signals, impinging from the directions $\Omega_g$. The theoretical explanation for that is provided in the below section Explanation of direction search algorithm.

From $\sigma^2(l)$ a number $\tilde{D}(l)$ of dominant directions $\Omega_{CURRDOM,\tilde{d}}(l)$, $1 \le \tilde{d} \le \tilde{D}(l)$, for the determination of the directional signal components is computed. The number of dominant directions is thereby constrained to fulfil $\tilde{D}(l) \le D$ in order to assure a constant data rate. However, if a variable data rate is allowed, the number of dominant directions can be adapted to the current sound scene.

One possibility to compute the $\tilde{D}(l)$ dominant directions is to set the first dominant direction to that with the maximum power, i.e. $\Omega_{CURRDOM,1}(l) = \Omega_{q_1}$ with $q_1 := argmax_{q \in \mathcal{M}_1} \sigma_q^2(l)$ and $\mathcal{M}_1 := \{1, 2, \ldots Q\}$. Assuming that the power maximum is created by a dominant directional signal, and considering the fact that using a HOA representation of finite order N results in a spatial dispersion of directional signals (cf. the above-mentioned "Plane-wave decomposition . . . " article), it can be concluded that in the directional neighbourhood of $\Omega_{CURRDOM,1}(l)$ there should occur power components belonging to the same directional signal. Since the spatial signal dispersion can be expressed by the function $v_N(\Theta_{q,q_1})$ (see eq. (38)), where $\Theta_{q,q_1} := \angle(\Omega_q, \Omega_{q_1})$ denotes the angle between $\Omega_q$ and $\Omega_{CURRDOM,1}(l)$, the power belonging to the directional signal declines according to $v_N^2(\Theta_{q,q_1})$. Therefore, it is reasonable to exclude all directions $\Omega_q$ in the directional neighbourhood of $\Omega_{q_1}$ with $\Theta_{q,1} \le \Theta_{MIN}$ for the search of further dominant directions. The distance $\Theta_{MIN}$ can be chosen as the first zero of $v_N(x)$, which is approximately given by $\pi/N$ for $N \ge 4$. The second dominant direction is then set to that with the maximum power in the remaining directions $\Omega_q \in \mathcal{M}_2$ with $\mathcal{M}_2 := \{q \in \mathcal{M}_1 | \Theta_{q,1} > \Theta_{MIN}\}$. The remaining dominant directions are determined in an analogous way.

The number $\tilde{D}(l)$ of dominant directions can be determined by regarding the powers $\sigma_{q_{\tilde{d}}}^2(l)$ assigned to the individual dominant directions $\Omega_{q_{\tilde{d}}}$ and searching for the case where the ratio $\sigma_{q_1}^2(l)/\sigma_{q_{\tilde{d}}}^2(l)$ exceeds the value of a desired direct to ambient power ratio $DAR_{MIN}$. This means that $\tilde{D}(l)$ satisfies $$10\log_{10}\left(\frac{\sigma_{q_1}^2(l)}{\sigma_{q_{\tilde{D}(l)}}^2(l)}\right) \le DAR_{MIN} \wedge \left[10\log_{10}\left(\frac{\sigma_{q_1}^2(l)}{\sigma_{q_{\tilde{D}(l)+1}}^2(l)}\right) > DAR_{MIN} \vee \tilde{D}(l) = D\right]. \tag{81}$$

The overall processing for the computation of all dominant directions is can be carried out as follows:

Algorithm 1 Search of dominant directions given power distribution on the sphere PowerFlag = true
$\tilde{d} = 1$
$\mathcal{M}_1 = \{1, 2, \ldots, Q\}$
repeat
  $q_d = \underset{q \in \mathcal{M}_g}{\mathrm{argmax}}\, \sigma_g^2(l)$
  if $\left[\tilde{d} > 1 \wedge 10\log_{10}\left(\frac{\sigma_{q_1}^2(l)}{\sigma_{q_{\tilde{d}}}^2(l)}\right) > DAR_{MIN}\right]$ then
    PowerFlag = false
  else
    $\Omega_{CURRDOM,d}(l) = \Omega_{q_d}$
    $\mathcal{M}_{\tilde{d}+1} = \{q \in \mathcal{M}_{\tilde{d}} | \angle(\Omega_q, \Omega_{q_d}) > \Theta_{MIN}\}$
    $\tilde{d} = \tilde{d} + 1$
  end if
until $[\tilde{d} > D \vee \text{PowerFlag} = \text{false}]$
$\tilde{D}(l) = \tilde{d} - 1$ Next, the directions $\Omega_{CURRDOM,\tilde{d}}(l)$, $1 \le \tilde{d} \le \tilde{D}(l)$, obtained in the current frame are smoothed with the directions from the previous frames, resulting in smoothed directions $\bar{\Omega}_{DOM,d}(l)$, $1 \le d \le D$. This operation can be subdivided into two successive parts:

(a) The current dominant directions $\Omega_{CURRDOM,\tilde{d}}(l)$, $1 \le \tilde{d} \le \tilde{D}(l)$, are assigned to the smoothed directions $\bar{\Omega}_{DOM,d}(l-1)$, $1 \le d \le D$, from the previous frame. The assignment function $f_{\mathcal{A},l} : \{1, \ldots, \tilde{D}(l)\} \rightarrow \{1, \ldots, D\}$ is determined such that the sum of angles between assigned directions $$\Sigma_{\tilde{d}=1}^{\tilde{D}(l)} \angle(\Omega_{CURRDOM,\tilde{d}}(l), \bar{\Omega}_{DOM,f_{\mathcal{A},l}(\tilde{d})}(l-1)) \tag{82}$$

is minimised. Such an assignment problem can be solved using the well-known Hungarian algorithm, cf. H. W. Kuhn, "The Hungarian method for the assignment problem", Naval research logistics quarterly 2, no. 1-2, pp. 83-97, 1955. The angles between current directions $\Omega_{CURRDOM,\tilde{d}}(l)$ and inactive directions (see below for explanation of the term 'inactive direction') from the previous frame $\bar{\Omega}_{DOM,d}(l-1)$ are set to $2\Theta_{MIN}$. This operation has the effect that current directions $\Omega_{CURRDOM,\tilde{d}}(l)$, which are closer than $2\Theta_{MIN}$ to previously active directions $\bar{\Omega}_{DOM,d}(l-1)$, are attempted to be assigned to them. If the distance exceeds $2\Theta_{MIN}$, the corresponding current direction is assumed to belong to a new signal, which means that it is favoured to be assigned to a previously inactive direction $\bar{\Omega}_{DOM,d}(l-1)$.

Remark: when allowing a greater latency of the overall compression algorithm, the assignment of successive direction estimates may be performed more robust. For example, abrupt direction changes may be better identified without mixing them up with outliers resulting from estimation errors.

(b) The smoothed directions $\bar{\Omega}_{DOM,d}(l-1)$, $1\le d\le D$ are computed using the assignment from step (a). The smoothing is based on spherical geometry rather than Euclidean geometry. For each of the current dominant directions $\Omega_{CURRDOM,\tilde{d}}(l)$, $1\le\tilde{d}\le\tilde{D}(l)$, the smoothing is performed along the minor arc of the great circle crossing the two points on the sphere, which are specified by the directions $\Omega_{CURRDOM,\tilde{d}}(l)$ and $\bar{\Omega}_{DOM,d}(l-1)$. Explicitly, the azimuth and inclination angles are smoothed independently by computing the exponentially-weighted moving average with a smoothing factor $\alpha_\Omega$. For the inclination angle this results in the following smoothing operation:

$$\bar{\theta}_{DOM,f_{\mathcal{A},l}(\tilde{d})}(l)=(1-\alpha_\Omega)\cdot\bar{\theta}_{DOM,f_{\mathcal{A},l}(\tilde{d})}(l-1)+\alpha_\Omega\cdot\theta_{DOM,\tilde{d}}(l),\ 1\le\tilde{d}\le\tilde{D}(l). \tag{83}$$

For the azimuth angle the smoothing has to be modified to achieve a correct smoothing at the transition from $\pi-\varepsilon$ to $-\pi$, $\varepsilon>0$, and the transition in the opposite direction. This can be taken into consideration by first computing the difference angle modulo $2\pi$ as $$\Delta_{\phi,[0,2\pi[,\tilde{d}}(l):=[\phi_{DOM,\tilde{d}}(l)-\bar{\phi}_{DOM,f_{\mathcal{A},l}(\tilde{d})}(l-1)]\bmod 2\pi, \tag{84}$$

which is converted to the interval $[-\pi, \pi[$ by $$\Delta_{\phi,[-\pi,\pi[,\tilde{d}}(l):=\begin{cases}\Delta_{\phi,[0,2\pi[,\tilde{d}}(l) & \text{for } \Delta_{\phi,[0,2\pi[,\tilde{d}}(l)<\pi\\ \Delta_{\phi,[0,2\pi[,\tilde{d}}(l)-2\pi & \text{for } \Delta_{\phi,[0,2\pi[,\tilde{d}}(l)\ge\pi\end{cases}. \tag{85}$$

The smoothed dominant azimuth angle modulo $2\pi$ is determined as $$\bar{\phi}_{DOM,[0,2\pi[,\tilde{d}}(l):=[\bar{\phi}_{DOM,\tilde{d}}(l-1)+\alpha_\Omega\cdot\Delta_{\phi,[-\pi,\pi[,\tilde{d}}(l)]\bmod 2\pi \tag{86}$$

and is finally converted to lie within the interval $[-\pi, \pi[$ by $$\bar{\phi}_{DOM,\tilde{d}}(l)=\begin{cases}\bar{\phi}_{DOM,[0,2\pi[,\tilde{d}}(l) & \text{for } \bar{\phi}_{DOM,[0,2\pi[,\tilde{d}}(l)<\pi\\ \bar{\phi}_{DOM,[0,2\pi[,\tilde{d}}(l)-2\pi & \text{for } \bar{\phi}_{DOM,[0,2\pi[,\tilde{d}}(l)\ge\pi\end{cases}. \tag{87}$$

In case $\tilde{D}(l)<D$, there are directions $\bar{\Omega}_{DOM,d}(l-1)$ from the previous frame that do not get an assigned current dominant direction. The corresponding index set is denoted by $$\mathcal{M}_{NA}(l):=\{1,\ldots,D\}\setminus\{f_{\mathcal{A},l}(\tilde{d})|1\le\tilde{d}\le D\}. \tag{88}$$

The respective directions are copied from the last frame, i.e.

$$\bar{\Omega}_{DOM,d}(l)=\bar{\Omega}_{DOM,d}(l-1)\text{ for }\in\mathcal{M}_{NA}(l). \tag{89}$$

Directions which are not assigned for a predefined number $L_{IA}$ of frames are termed inactive.

Thereafter the index set of active directions denoted by $\mathcal{M}_{ACT}(l)$ is computed. Its cardinality is denoted by $D_{ACT}(l):=|\mathcal{M}_{ACT}(l)|$.

Then all smoothed directions are concatenated into a single direction matrix as $$\bar{\Omega}_{DOM}(l):=[\bar{\Omega}_{DOM,1}(l)\bar{\Omega}_{DOM,2}(l)\ldots\bar{\Omega}_{DOM,D}(l)|. \tag{90}$$

Computation of Direction Signals

The computation of the direction signals is based on mode matching. In particular, a search is made for those directional signals whose HOA representation results in the best approximation of the given HOA signal. Because the changes of the directions between successive frames can lead to a discontinuity of the directional signals, estimates of the directional signals for overlapping frames can be computed, followed by smoothing the results of successive overlapping frames using an appropriate window function. The smoothing, however, introduces a latency of a single frame.

The detailed estimation of the directional signals is explained in the following:

First, the mode matrix based on the smoothed active directions is computed according to $$\Xi_{ACT}(l):=\left[S_{DOM,d_{ACT,1}}(l)\ S_{DOM,d_{ACT,2}}(l)\ \cdots\ S_{DOM,d_{ACT,D_{ACT}(l)}}(l)\right]\in\mathbb{R}^{O\times D_{ACT}(l)} \tag{91}$$

with $$S_{DOM,d}(l):=\left[S_0^0(\bar{\Omega}_{DOM,d}(l)),S_1^{-1}(\bar{\Omega}_{DOM,d}(l)),S_1^0(\bar{\Omega}_{DOM,d}(l)),\ldots,S_N^N(\bar{\Omega}_{DOM,d}(l))\right]^T\in\mathbb{R}^O, \tag{92}$$

wherein $d_{ACT,j}$, $1\le j\le D_{ACT}(l)$ denotes the indices of the active directions.

Next, a matrix $X_{INST}(l)$ is computed that contains the non-smoothed estimates of all directional signals for the $(l-1)$-th and $l$-th frame:

$$X_{INST}(l):=[x_{INST}(l,1)x_{INST}(l,2)\ldots x_{INST}(l,2B)]\in\mathbb{R}^{D\times 2B} \tag{93}$$

with $$x_{INST}(l,j)=[x_{INST,1}(l,j),x_{INST,2}(l,j),\ldots,x_{INST,D}(l,j)]^T\in\mathbb{R}^D,\ 1\le j\le 2B. \tag{94}$$

This is accomplished in two steps. In the first step, the directional signal samples in the rows corresponding to inactive directions are set to zero, i.e.

$$x_{INST,d}(l,j)=0\ \forall 1\le j\le 2B,\text{ if } d\notin\mathcal{M}_{ACT}(l). \tag{95}$$

In the second step, the directional signal samples corresponding to active directions are obtained by first arranging them in a matrix according to $$X_{INST,ACT}(l):=\begin{bmatrix}x_{INST,d_{ACT,1}}(l,1) & \cdots & x_{INST,d_{ACT,1}}(l,2B)\\ \vdots & \ddots & \vdots\\ x_{INST,d_{ACT,D_{ACT}(l)}}(l,1) & \cdots & x_{INST,d_{ACT,D_{ACT}(l)}}(l,2B)\end{bmatrix}. \tag{96}$$

This matrix is then computed such as to minimise the Euclidean norm of the error $$\Xi_{ACT}(l)X_{INST,ACT}(l)-[C(l-1)C(l)]. \tag{97}$$

The solution is given by $$X_{INST,ACT}(l)=[\Xi_{ACT}^T(l)\Xi_{ACT}(l)]^{-1}\Xi_{ACT}^T(l)[C(l-1)C(l)]. \tag{98}$$

The estimates of the directional signals $x_{INST,d}(l, j)$, $1\le d\le D$, are windowed by an appropriate window function $w(j)$:

$$x_{INST,WIN,d}(l,j):=x_{INST,d}(l,j)\cdot w(j),\ 1\le j\le 2B. \tag{99}$$

An example for the window function is given by the periodic Hamming window defined by $$w(j) := \begin{cases} K_w\left[0.54 - 0.46\cos\left(\frac{2\pi j}{2B+1}\right)\right] & \text{for } 1 \le j \le 2B \\ 0 & \text{else} \end{cases}, \tag{100}$$

where $K_w$ denotes a scaling factor which is determined such that the sum of the shifted windows equals '1'. The smoothed directional signals for the (l−1)-th frame are computed by the appropriate superposition of windowed non-smoothed estimates according to $$x_d((l-1)B+j) = x_{INST,WIN,d}(l-1, B+j) + x_{INST,WIN,d}(l, j). \tag{101}$$

The samples of all smoothed directional signals for the (l−1)-th frame are arranged in matrix $$X(l-1) \text{ as} \tag{102}$$

$$X(l-1) := [x((l-1)B+1)x((l-1)B+2) \ldots x((l-1)B+B)] \in \mathbb{R}^{D\times B} \text{ with } (j) = [x_1(j), x_2(j), \ldots, x_D(j)]^T \in \mathbb{R}^D. \tag{103}$$

Computation of Ambient HOA Component

The ambient HOA component $C_A(l-1)$ is obtained by subtracting the total directional HOA component $C_{DIR}(l-1)$ from the total HOA representation C(l−1) according to $$C_A(l-1) := C(l-1) - C_{DIR}(l-1) \in \mathbb{R}^{O\times B}, \tag{104}$$

where $C_{DIR}(l-1)$ is determined by $$C_{DIR}(l-1) := \Xi_{DOM}(l-1)\begin{bmatrix} x_{INST,WIN,1}(l-1, B+1) & & x_{INST,WIN,1}(l-1, 2B \\ \vdots & \ddots & \vdots \\ x_{INST,WIN,D}(l-1, B+1) & & x_{INST,WIN,D}(l-1, 2B \end{bmatrix} + \Xi_{DOM}(l)\begin{bmatrix} x_{INST,WIN,1}(l, 1) & & x_{INST,WIN,1}(l, B) \\ \vdots & \ddots & \vdots \\ x_{INST,WIN,D}(l, 1) & & x_{INST,WIN,D}(l, B) \end{bmatrix}, \tag{105}$$

and where $\Xi_{DOM}(l)$ denotes the mode matrix based on all smoothed directions defined by $$\Xi_{DOM}(l) := [S_{DOM,1}(l)S_{DOM,2}(l) \ldots S_{DOM,D}(l)] \in \mathbb{R}^{O\times D}. \tag{106}$$

Because the computation of the total directional HOA component is also based on a spatial smoothing of overlapping successive instantaneous total directional HOA components, the ambient HOA component is also obtained with a latency of a single frame.

Order Reduction for Ambient HOA Component

Expressing $C_A(l-1)$ through its components as $$C_A(l-1) = \begin{bmatrix} c_{0,A}^0((l-1)B+1) & & c_{0,A}^0((l-1)B+B) \\ \vdots & \ddots & \vdots \\ c_{N,A}^N((l-1)B+1) & & c_{N,A}^N((l-1)B+B) \end{bmatrix}. \tag{107}$$

the order reduction is accomplished by dropping all HOA coefficients $c_{n,A}^m(j)$ with $n > N_{RED}$:

$$C_{A,RED}(l-1) := \begin{bmatrix} c_{0,A}^0((l-1)B+1) & & c_{0,A}^0((l-1)B+B) \\ \vdots & \ddots & \vdots \\ c_{N_{RED},A}^{N_{RED}}((l-1)B+1) & & c_{N_{RED},A}^{N_{RED}}((l-1)B+B) \end{bmatrix} \in \mathbb{R}^{O_{RE}\times B}. \tag{108}$$

Spherical Harmonic Transform for Ambient HOA Component

The Spherical Harmonic Transform is performed by the multiplication of the ambient HOA component of reduced order $C_{A,RED}(l)$ with the inverse of the mode matrix $$\Xi := [S_{A,1} \;\; S_{A,2} \;\; \ldots \;\; S_{A,O_{RED}}] \in \mathbb{R}^{O_{RED}\times O_{RED}} \tag{109}$$

with $$S_{A,d} := \left[S_0^0(\Omega_{A,a}), S_1^{-1}(\Omega_{A,d}), S_1^0(\Omega_{A,d}), \ldots, S_{N_{RED}}^{N_{RED}}(\Omega_{A,a})\right]^T \in \mathbb{R}^{O_{RED}}, \tag{110}$$

based on $O_{RED}$ being uniformly distributed directions $$\Omega_{A,d},\; 1 \le d \le O_{RED}\colon\; W_{A,RED}(l) = (\Xi_A)^{-1} C_{A,RED}(l). \tag{111}$$

Decompression

Inverse Spherical Harmonic Transform

The perceptually decompressed spatial domain signals $\hat{W}_{A,RED}(l)$ are transformed to a HOA domain representation $\hat{C}_{A,RED}(l)$ of order $N_{RED}$ via an Inverse Spherical Harmonics Transform by $$\hat{C}_{A,RED}(l) = \Xi_A \hat{W}_{A,RED}(l). \tag{112}$$

Order Extension

The Ambisonics order of the HOA representation $\hat{C}_{A,RED}(l)$ is extended to N by appending zeros according to $$\hat{C}_A(l) := \begin{bmatrix} \hat{C}_{A,RED}(l) \\ 0_{(O-O_{RED})\times B} \end{bmatrix} \in \mathbb{R}^{O\times B}, \tag{113}$$

where $0_{m\times n}$ denotes a zero matrix with m rows and n columns.

HOA Coefficients Composition

The final decompressed HOA coefficients are additively composed of the directional and the ambient HOA component according to $$\hat{C}(l-1) := \hat{C}_A(l-1) + \hat{C}_{DIR}(l-1). \tag{114}$$

At this stage, once again a latency of a single frame is introduced to allow the directional HOA component to be computed based on spatial smoothing. By doing this, potential undesired discontinuities in the directional component of the sound field resulting from the changes of the directions between successive frames are avoided.

To compute the smoothed directional HOA component, two successive frames containing the estimates of all individual directional signals are concatenated into a single long frame as $$\hat{X}_{INST}(l) := [\hat{X}(l-1)\hat{X}(l)] \in \mathbb{R}^{D\times 2B}. \tag{115}$$

Each of the individual signal excerpts contained in this long frame are multiplied by a window function, e.g. like that of eq. (100). When expressing the long frame $\hat{X}_{INST}(l)$ through its components by $$\hat{X}_{INST}(l) = \begin{bmatrix} \hat{x}_{INST,1}(l,1) & \hat{x}_{INST,1}(l,2B) \\ \vdots & \ddots \ \vdots \\ \hat{x}_{INST,D}(l,1) & \hat{x}_{INST,D}(l,2B) \end{bmatrix}, \tag{116}$$

the windowing operation can be formulated as computing the windowed signal excerpts $\hat{x}_{INST,WIN,d}(l, j)$, $1 \le d \le D$, by $$\hat{x}_{INST,WIN,d}(l,j) = \hat{x}_{INST,d}(l,j) \cdot w(j),\ 1 \le j \le 2B,\ 1 \le d \le D. \tag{117}$$

Finally, the total directional HOA component $C_{DIR}(l-1)$ is obtained by encoding all the windowed directional signal excerpts into the appropriate directions and superposing them in an overlapped fashion:

$$\hat{C}_{DIR}(l-1) = \Xi_{DOM}(l-1) \begin{bmatrix} \hat{x}_{INST,WIN,1}(l-1,B+1) & \hat{x}_{INST,WIN,1}(l-1,2B) \\ \vdots & \ddots \ \vdots \\ \hat{x}_{INST,WIN,D}(l-1,B+1) & \hat{x}_{INST,WIN,D}(l-1,2B) \end{bmatrix} + \Xi_{DOM}(l) \begin{bmatrix} \hat{x}_{INST,WIN,1}(l,1) & \hat{x}_{INST,WIN,1}(l,B) \\ \vdots & \ddots \ \vdots \\ \hat{x}_{INST,WIN,D}(l,1) & \hat{x}_{INST,WIN,D}(l,B) \end{bmatrix}. \tag{118}$$

Explanation of Direction Search Algorithm

In the following, the motivation is explained behind the direction search processing described in section Estimation of dominant directions. It is based on some assumptions which are defined first.

Assumptions

The HOA coefficients vector c(j), which is in general related to the time domain amplitude density function d(j, Ω) through $$c(j) = \int_{S^2} d(j,\Omega) S(\Omega) d\Omega, \tag{119}$$

is assumed to obey the following model:

$$c(j) = \sum_{i=1}^{I} x_i(j) S(\Omega_{x_i}(l)) + c_A(j) \text{ for } lB+1 \le j \le (l+1)B. \tag{120}$$

This model states that the HOA coefficients vector c(j) is on one hand created by I dominant directional source signals $x_i(j)$, $1 \le i \le I$, arriving from the directions $\Omega_{x_i}(l)$ in the l-th frame. In particular, the directions are assumed to be fixed for the duration of a single frame. The number of dominant source signals I is assumed to be distinctly smaller than the total number of HOA coefficients O. Further, the frame length B is assumed to be distinctly greater than O. On the other hand, the vector c(j) consists of a residual component $c_A(j)$, which can be regarded as representing the ideally isotropic ambient sound field.

The individual HOA coefficient vector components are assumed to have the following properties:

The dominant source signals are assumed to be zero mean, i.e.

$$\sum_{j=lB+1}^{(l+1)B} x_i(j) \approx 0 \ \forall 1 \le i \le I, \tag{121}$$

and are assumed to be uncorrelated with each other, i.e.

$$\frac{1}{B} \sum_{j=lB+1}^{(l+1)B} x_i(j) x_{i'}(j) \approx \delta_{i-i'} \overline{\sigma}_{x_i}^2(l) \quad \forall 1 \le i, i' \le I \tag{122}$$

with $\overline{\sigma}_{x_i}^2(l)$ denoting the average power of the i-th signal for the l-th frame.

The dominant source signals are assumed to be uncorrelated with the ambient component of HOA coefficient vector, i.e.

$$\frac{1}{B} \sum_{j=lB+1}^{(l+1)B} x_i(j) c_A(j) \approx 0 \quad \forall 1 \le i \le I. \tag{123}$$

The ambient HOA component vector is assumed to be zero mean and is assumed to have the covariance matrix $$\sum_A(l) := \frac{1}{B} \sum_{j=lB+1}^{(l+1)B} c_A(j) c_A^T(j). \tag{124}$$

The direct-to-ambient power ratio DAR(l) of each frame l, which is here defined by $$DAR(l) := 10 \log_{10} \left[ \frac{\max_{1 \le i \le I} \overline{\sigma}_{x_i}^2(l)}{\left\| \sum_A(l) \right\|^2} \right], \tag{125}$$

is assumed to be greater than a predefined desired value $DAR_{MIN}$, i.e.

$$DAR(l) \ge DAR_{MIN}. \tag{126}$$

Explanation of Direction Search

For the explanation the case is considered where the correlation matrix B(l) (see eq. (67)) is computed based only on the samples of the l-th frame without considering the samples of the L−1 previous frames. This operation corresponds to setting L=1. Consequently, the correlation matrix can be expressed by $$B(l) = \frac{1}{B} C(l) C^T(l) \tag{127}$$

$$= \frac{1}{B} \sum_{j=lB+1}^{(l+1)B} c(j) c^T(j). \tag{128}$$

By substituting the model assumption in eq. (120) into eq. (128) and by using equations (122) and (123) and the definition in eq. (124), the correlation matrix B(l) can be approximated as $$B(l) = \frac{1}{B} \sum_{j=lB+1}^{(l+1)B} \left[ \sum_{i=1}^{I} x_i(j) S(\Omega_{x_i}(l)) + c_A(j) \right] \left[ \sum_{i'=1}^{I} x_{i'}(j) S(\Omega_{x_{i'}}(l)) + c_A(j) \right]^T \tag{129}$$

$$= \sum_{i=1}^{I} \sum_{i'=1}^{I} S(\Omega_{x_i}(l)) S^T(\Omega_{x_{i'}}(l)) \frac{1}{B} \sum_{j=lB+1}^{(l+1)B} x_i(j) x_{i'}(j) + \sum_{i=1}^{I} S(\Omega_{x_i}(l)) \frac{1}{B} \sum_{j=lB+1}^{(l+1)B} x_i(j) c_A^T(j) + \sum_{i'=1}^{I} \frac{1}{B} \sum_{j=lB+1}^{(l+1)B} x_{i'}(j) c_A(j) S^T(\Omega_{x_{i'}}(l)) + \frac{1}{B} \sum_{j=lB+1}^{(l+1)B} c_A(j) c_A^T(j) \tag{130}$$

$$\approx \sum_{i=1}^{I} \overline{\sigma}_{x_i}^2(l) S(\Omega_{x_i}(l)) S^T(\Omega_{x_i}(l)) + \sum_A(l). \tag{131}$$

From eq. (131) it can be seen that B(l) approximately consists of two additive components attributable to the directional and to the ambient HOA component. Its $\mathcal{J}(l)$-rank approximation $\mathbf{B}_{\mathcal{J}}(l)$ provides an approximation of the directional HOA component, i.e.

$$\mathbf{B}_{\mathcal{J}}(l) \approx \sum_{i=1}^{I} \overline{\sigma}_{x_i}^{2}(l) S(\Omega_{x_i}(l)) S^T(\Omega_{x_i}(l)), \tag{132}$$

which follows from the eq. (126) on the directional-to-ambient power ratio.

However, it should be stressed that some portion of $\Sigma_A(l)$ will inevitably leak into $\mathbf{B}_{\mathcal{J}}(l)$, since $\Sigma_A(l)$ has full rank in general and thus, the subspaces spanned by the columns of the matrices $\sum_{i=1}^{I} \overline{\sigma}_{x_i}^{2}(l) S(\Omega_{x_i}(l)) S^T(\Omega_{x_i}(l))$ and $\Sigma_A(l)$ are not orthogonal to each other. With eq. (132) the vector $\sigma^2(l)$ in eq. (77), which is used for the search of the dominant directions, can be expressed by $\sigma^2(l) = \mathrm{diag}(\Xi^T \mathbf{B}_{\mathcal{J}}(l) \Xi)$ $$= \mathrm{diag}\left(\begin{bmatrix} S^T(\Omega_1) B_{\mathcal{J}}(l) S(\Omega_1) & & S^T(\Omega_1) B_{\mathcal{J}}(l) S(\Omega_Q) \\ \vdots & \ddots & \vdots \\ S^T(\Omega_Q) B_{\mathcal{J}}(l) S(\Omega_1) & & S^T(\Omega_Q) B_{\mathcal{J}}(l) S(\Omega_Q) \end{bmatrix}\right) \approx \tag{134}$$

$$\mathrm{diag}\left(\begin{bmatrix} \sum_{i=1}^{I} \overline{\sigma}_{x_i}^{2}(l)\, v_N^2\left(\angle(\Omega_1, \Omega_{x_i})\right) & & \sum_{i=1}^{I} \overline{\sigma}_{x_i}^{2}(l)\, v_N\left(\angle(\Omega_1, \Omega_{x_i})\right) v_N\left(\angle(\Omega_{x_i}, \Omega_Q)\right) \\ \vdots & \ddots & \vdots \\ \sum_{i=1}^{I} \overline{\sigma}_{x_i}^{2}(l)\, v_N\left(\angle(\Omega_Q, \Omega_{x_i})\right) v_N\left(\angle(\Omega_{x_i}, \Omega_1)\right) & & \sum_{i=1}^{I} \overline{\sigma}_{x_i}^{2}(l)\, v_N\left(\angle(\Omega_Q, \Omega_{x_i})\right) \end{bmatrix}\right) \tag{135}$$

$$= \left[\sum_{i=1}^{I} \overline{\sigma}_{x_i}^{2}(l)\, v_N^2\left(\angle(\Omega_1, \Omega_{x_i})\right) \;\ldots\; \sum_{i=1}^{I} \overline{\sigma}_{x_i}^{2}(l)\, v_N^2\left(\angle(\Omega_Q, \Omega_{x_i})\right)\right]^T. \tag{136}$$

In eq. (135) the following property of Spherical Harmonics shown in eq. (47) was used:

$$S^T(\Omega_q) S(\Omega_{q'}) = v_N(\angle(\Omega_q, \Omega_{q'})). \tag{137}$$

Eq. (136) shows that the $\sigma_q^2(l)$ components of $\sigma^2(l)$ are approximations of the powers of signals arriving from the test directions $\Omega_q$, $1 \le q \le Q$.

The invention claimed is:

1. A method for decompressing a compressed Higher Order Ambisonics (HOA) signal, the method comprising:
- receiving the compressed HOA signal;
- receiving directional information associated with the compressed HOA signal, wherein the directional information includes information regarding a set of active directions;
- decoding the compressed HOA signal to determine a decoded directional HOA signal and a decoded ambient HOA signal, wherein the decoded directional HOA signal is decoded based on the set of active directions;
- performing order extension on the decoded ambient HOA signal to obtain an order extended representation of the decoded ambient HOA signal; and
- recomposing a decoded HOA representation from the order extended representation of the decoded ambient HOA signal and the decoded directional HOA signal.

2. The method of claim 1, wherein the decoded HOA representation has a first order greater than one.

3. A non-transitory computer-readable medium having stored thereon instructions, that when executed by one or more processors, cause one or more processors to perform the method of claim 1.

4. An apparatus for decompressing a compressed Higher Order Ambisonics (HOA) signal, the apparatus comprising:
- an input interface that receives the compressed HOA signal and that receives directional information associated with the compressed HOA signal, wherein the directional information includes information regarding a set of active directions;
- an audio decoder that decodes the compressed HOA signal to determine a decoded directional HOA signal and a decoded ambient HOA signal, wherein the decoded directional HOA signal is decoded based on the set of active directions;
- a processor for performing order extension on the decoded ambient HOA signal to obtain an order extended representation of the decoded ambient HOA signal; and
- a synthesizer for recomposing a decoded HOA representation from the order extended representation of the decoded ambient HOA signal and the decoded directional HOA signal.

5. The apparatus of claim 4, wherein the decoded HOA representation has a first order greater than one.

* * * * *